(12) United States Patent
Katsura et al.

(10) Patent No.: US 10,838,408 B2
(45) Date of Patent: Nov. 17, 2020

(54) VIBRATION CONTROL DEVICE, VIBRATION CONTROL METHOD, VIBRATION CONTROL SYSTEM, PROGRAM, AND RECORDING MEDIUM

(71) Applicant: KEIO UNIVERSITY, Tokyo (JP)

(72) Inventors: Seiichiro Katsura, Kanagawa (JP); Eiichi Saito, Kanagawa (JP)

(73) Assignee: KEIO UNIVERSITY, Tokyo (JP)

( * ) Notice: Subject to any disclaimer, the term of this patent is extended or adjusted under 35 U.S.C. 154(b) by 90 days.

(21) Appl. No.: 15/750,855

(22) PCT Filed: Jul. 19, 2016

(86) PCT No.: PCT/JP2016/071173
§ 371 (c)(1),
(2) Date: May 24, 2018

(87) PCT Pub. No.: WO2017/026234
PCT Pub. Date: Feb. 16, 2017

(65) Prior Publication Data
US 2019/0072935 A1 Mar. 7, 2019

(30) Foreign Application Priority Data

Aug. 7, 2015 (JP) .................................. 2015-157780

(51) Int. Cl.
*F16F 15/02* (2006.01)
*G05B 19/416* (2006.01)
*G05B 11/36* (2006.01)
*G05D 19/02* (2006.01)

(52) U.S. Cl.
CPC ............ *G05B 19/416* (2013.01); *F16F 15/02* (2013.01); *G05B 11/36* (2013.01); *G05D 19/02* (2013.01); *G05B 2219/41402* (2013.01); *G05B 2219/42055* (2013.01)

(58) Field of Classification Search
CPC .......... G05B 19/416; G05B 11/36; F16F 15/02
See application file for complete search history.

(56) References Cited

U.S. PATENT DOCUMENTS

| 2004/0239280 | A1 | 12/2004 | Zhang et al. | |
| 2009/0224717 | A1* | 9/2009 | Sawaragi | G05B 5/01 318/610 |
| 2014/0203752 | A1* | 7/2014 | Yamamoto | G05B 5/00 318/620 |

FOREIGN PATENT DOCUMENTS

| EP | 1664864 | 12/2007 |
| JP | H04-112205 | 4/1992 |
| JP | H9-22303 | 1/1997 |
| JP | 2002-325473 | 11/2002 |
| JP | 2003-033066 | 1/2003 |

(Continued)

OTHER PUBLICATIONS

International Search Report for PCT/JP2016/071173 dated Sep. 20, 2016.

*Primary Examiner* — Cortez M Cook
(74) *Attorney, Agent, or Firm* — IPUSA, PLLC

(57) ABSTRACT

A vibration control device moves an object by controlling an actuator. The vibration control device controls a position and speed of the actuator, generates a model by modeling the object; and calculates an inverse system output based on the model and the control to provide positive feedback of a position of the object based on the inverse system output.

12 Claims, 18 Drawing Sheets

(56) References Cited

FOREIGN PATENT DOCUMENTS

JP  2007-200463  8/2007
WO  2014/126177  8/2014

* cited by examiner

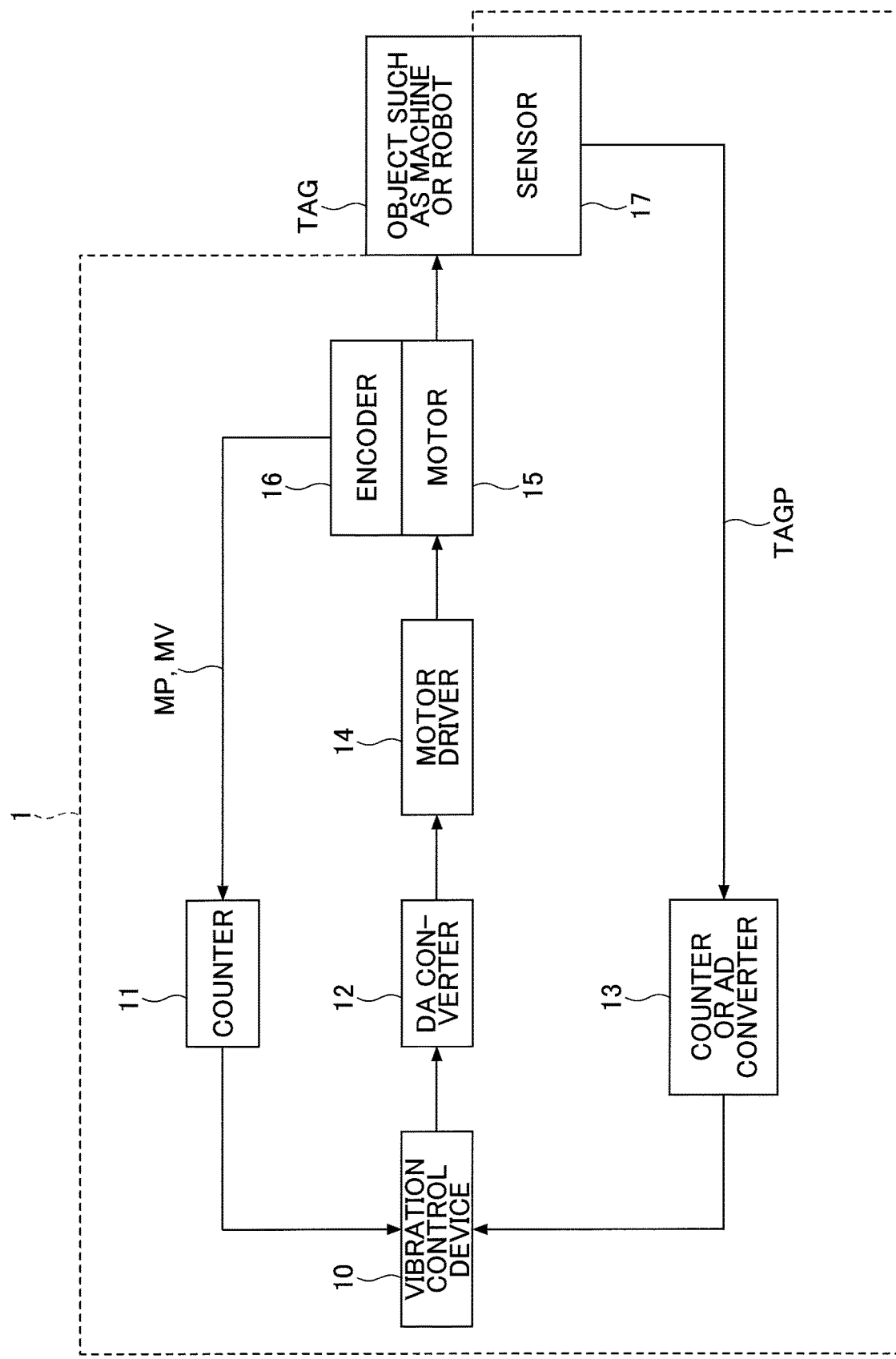

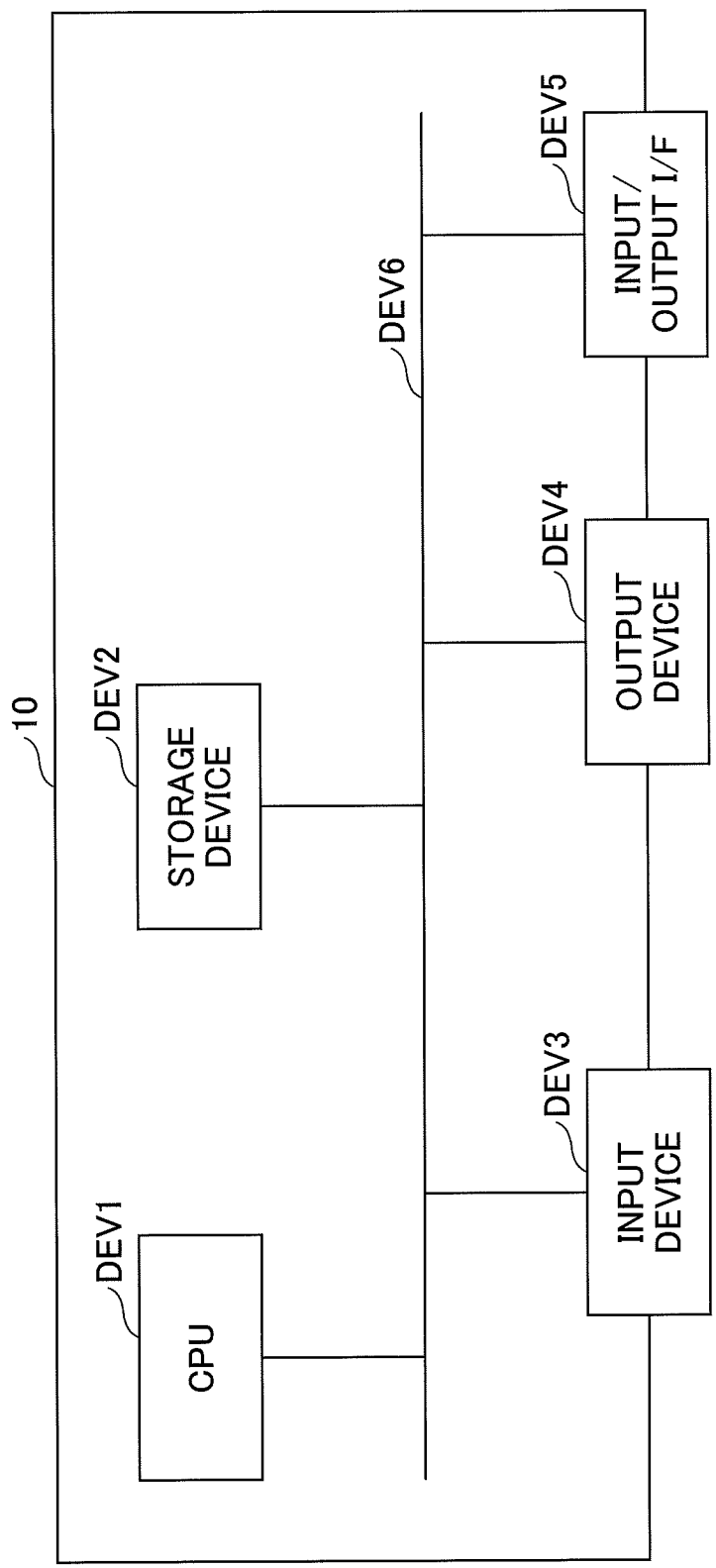

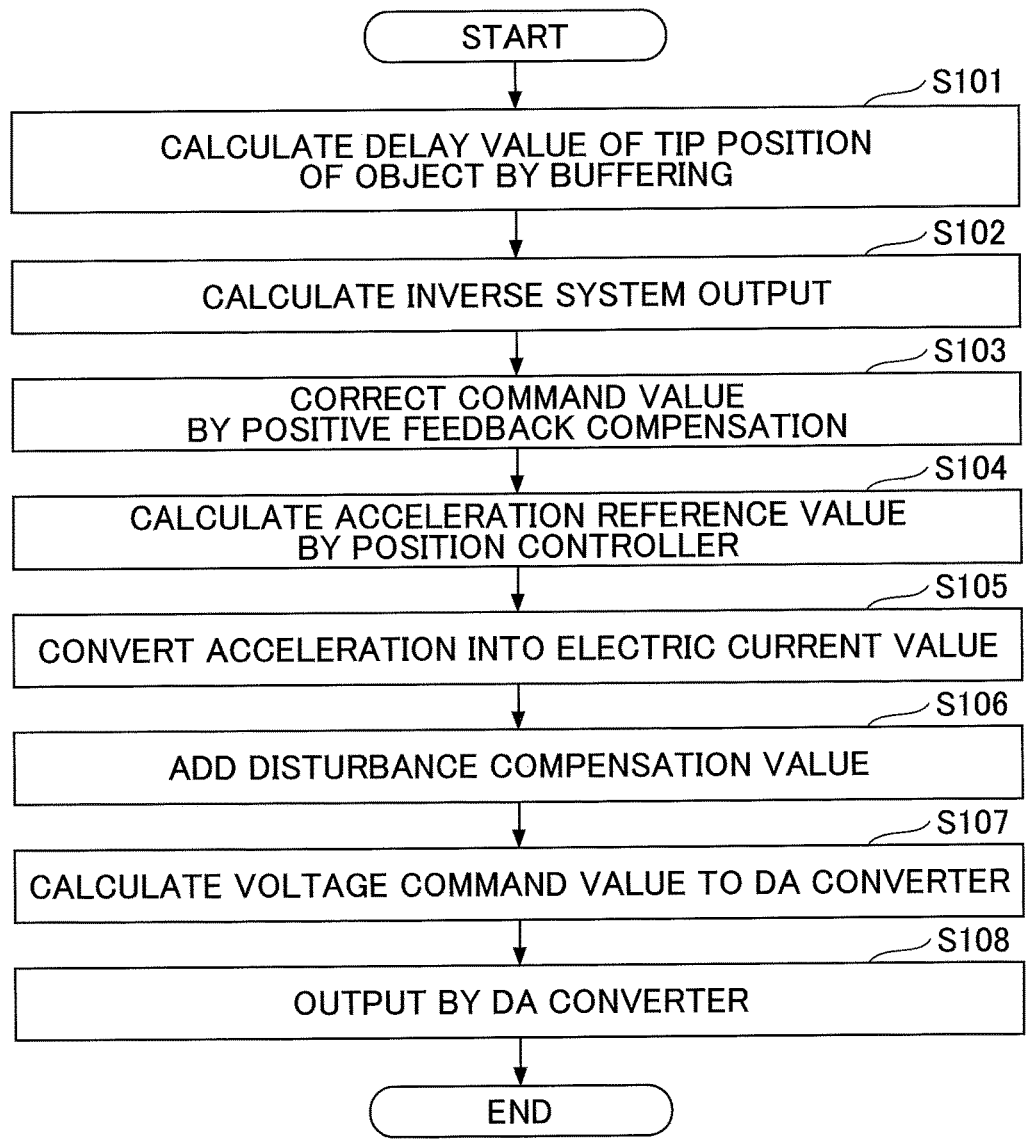
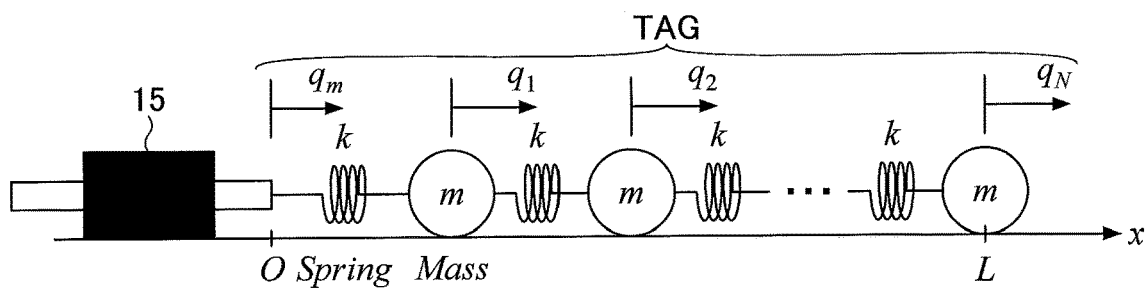

VIBRATION CONTROL DEVICE, VIBRATION CONTROL METHOD, VIBRATION CONTROL SYSTEM, PROGRAM, AND RECORDING MEDIUM

BACKGROUND OF THE INVENTION

1. Field of the Invention

The present invention is related to an vibration control device, an vibration control method, an vibration control system, a program, and a recording medium.

2. Description of the Related Art

A control method has been known, such as a Sliding Mode Control, or an H-infinity Control, that is highly robust against uncertainty, such as a disturbance.

For example, in Patent Document 1, a method, etc., has been known such that a speed of a mechanical system is caused to accurately follow a target speed by removing a high frequency component of a speed feedback signal and compensating for a phase delay caused by a delay element during control, so as not to cause a high frequency vibration. Specifically, a method has been known such that an output from a model of a mechanical system, which is obtained by causing an output to pass through a model of a filter element and a model of an overhead time delay element, is caused to be equal to the speed of the mechanical system, and the output from the model of the mechanical system is used as feedback to a speed control system.

CITATION LIST

Patent Literature

[PTL 1] Japanese Unexamined Patent Application Publication No. 2003-33066

SUMMARY OF THE INVENTION

Technical Problem

When a control target is controlled, for example, at a high speed or on a broadband, a vibration may occur due to resonance, etc. When an object that is the control target is lightweight as a result that weight of a control target is reduced for lowering conveyance cost or for saving energy, a vibration caused by resonance, etc., may occur in a low frequency region. In a usual method, in order to reduce the effect of a vibration, such as resonance, a stabilizing compensator, etc., is required, and the controller, etc., may be complicated in many cases.

In order to solve the above-described problem, in the present invention, considering a delay time, etc., at the position of the control target, positive feedback (Positive Feedback) is performed in which a phase is not inverted. Accordingly, as an aspect of the present invention, an object is to provide, a vibration control device, a vibration control method, a vibration control system, and a program with which control can be performed so that a vibration of the control target can be reduced.

Means to Solve the Problem

According to an aspect of the present invention, a vibration control device for moving an object by controlling an actuator includes an actuator controller configured to control a position and speed of the actuator; a modelling unit configured to generate a model by modeling the object; and a feedback unit configured to calculate an inverse system output based on the model and the control, and configured to provide positive feedback of a position of the object based on the inverse system output.

Effect of the Invention

By the embodiment of the present invention, there can be provided a vibration control device, a vibration control method, a vibration control system, and a program that can perform control so that the vibration of the target can be reduced.

BRIEF DESCRIPTION OF THE DRAWINGS

FIG. 1 is a block diagram illustrating an example of an entire configuration of a vibration control device according to an embodiment of the present invention.

FIG. 2 is a block diagram illustrating an example of a hardware configuration of the vibration control device according to the embodiment of the present invention.

FIG. 3 is a flowchart illustrating an example of an entire process by the vibration control device according to the embodiment of the present invention.

FIG. 4 is a schematic diagram illustrating an example of a multi-inertial resonance system modeled by a vibration control device according to the embodiment of the present invention.

DESCRIPTION OF THE PREFERRED EMBODIMENTS

Figure 5:
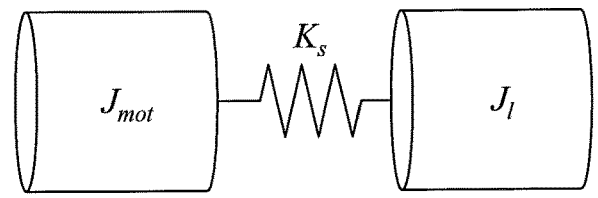
FIG. 5 is a schematic diagram illustrating an example of a bi-inertial resonance system modeled by the vibration control device according to the embodiment of the present invention.

In the following, an embodiment of the present invention is described by mainly referring to the accompanying drawings. Note that, in the embodiment illustrated in the specification and the drawings, identical reference numerals and identical names are attached to elements that are substantially the same, and a description may be omitted for overlapping elements. Furthermore, in the following description, identical variables are described by attaching same characters.

[Overall Configuration Example and Hardware Configuration Example]

FIG. 1 is a block diagram illustrating an example of an overall structure of a vibration control device according to the embodiment of the present invention. In the following, the depicted vibration control system 1 is exemplified and described. The depicted vibration control system 1 includes a vibration control device 10; a counter 11; a DA (Digital-Analog) converter 12; a counter or AD (Analog-Digital) converter 13 (which is simply referred to as "AD converter 13," hereinafter); a motor driver 14; a motor 15 as an example of an actuator; an encoder 16; and a sensor 17.

As depicted, the counter 11, the DA converter 12, and the AD converter 13 are connected to the vibration control device 10 through cables, etc., respectively. Further, the motor driver 14 is connected to the DA converter 12 through a cable, etc. Furthermore, the motor 15 is connected to the motor driver 14 through a cable, etc. Furthermore, an example of an object, i.e., a machine or a robot, etc., (which is simply referred to as "machine TAG," hereinafter) that may be an example of a control target is connected to or contacts the motor 15.

Additionally, as depicted, the encoder 16 is connected to the motor 15. In this case, a rotation amount of the motor 15, i.e., a signal indicating a position of the motor MP by an angle, etc., and rotation speed of the motor 15, i.e., a signal indicating speed of the motor MV by angular velocity, etc., are respectively output from the encoder 16 to the counter 11. Next, the counter 11 converts the signals output from the encoder 16 into data items, such as counter values, to be output to the vibration control device 10.

As depicted, a sensor 17 is attached to the machine TAG. In this case, a signal indicating a position of the machine TAGP of the machine TAG is output from the sensor 17 to the AD controller 13. Next, upon detecting that the signal from the sensor 17 is an analog signal, the AD converter 13 applies the A/D conversion to the signal to generate the data indicating the location TAGP of the machine TAG, and the AD converter 13 outputs the generated data to the vibration control device 10.

Note that the vibration control system 1 is not limited to the depicted configuration. For example, the devices, such as the counter 11, the DA convertor 12, the AD converter 13, and the motor driver 14, may not be separate devices; and these devices may be integrated with the vibration control device 10, etc. Alternatively, each of these devices may be formed of a plurality of devices.

The DA converter 12 outputs, to the motor driver 14, a control signal, which is for controlling the motor 15 from the vibration control device 10. Next, the motor driver 14 controls the motor 15 based on the input control signal. Then, when the motor 15 moves under control of the motor driver, if the machine TAG and the motor 15 are connected, the machine TAG moves in accordance with the movement of the motor 15. Note that the actuator is not limited to the motor 15; and the actuator may be another type of actuator, such as a linear actuator.

The position MP and the velocity MV of the motor 15 that indicate movement of the motor 15 are measured by the counter 11 and the encoder 16, etc., to be output to the vibration control device 10. Additionally, the position TAGP of the machine TAG is measured by the AD converter 13 and the sensor 17, etc., to be output to the vibration control device 10.

The encoder 16 may be a measuring device that is capable of measuring the position MP and the velocity MV of the motor 15; and, for example, the encoder 16 may be another type of a measuring device, such as a potentiometer. Note that the counter 11 may be changed depending on the type of the encoder 16; and, for example, if the encoder 16 is a measuring device that outputs an analog signal, such as a potentiometer, the counter 11 may be an AD converter, etc.

Similarly, the sensor 17 may be a measuring device that is capable of measuring the position TAGP of the machine TAG. For example, the sensor 17 is a laser diode and a position detecting element (PSD (Position Sensitive Detector)), etc. Note that the sensor 17 is not limited to a laser diode, etc.; and the sensor 17 may be another type of a measuring device that can measure a position. For example, the sensor 17 may be a high-speed camera, etc.

FIG. 2 is a block diagram illustrating an example of a hardware configuration of the vibration control device according to the embodiment of the present invention. For example, the vibration control device 10 includes a CPU (Central Processing Unit) DEV 1; a storage device DEV 2; an input device DEV 3; an output device DEV 4; and an input/output I/F (interface) DEV 5. Further, as depicted, the devices included in the vibration control device 10 are connected through a bus DEV 6; and the devices mutually transmit and receive data, signals, etc.

As depicted, the vibration control device 10 is an information processing device, such as a PC (Personal Computer). Note that the vibration control device 10 is not limited to the PC; and the vibration control device 10 may be a type of an information processing device other than the PC, such as a server, a work station, a tablet, an electric circuit, a microcomputer, or a combination thereof. In the following, an example is described, in which the vibration control device 10 is the PC with the depicted hardware configuration.

The CPU DEV 1 is a processor for executing processes for implementing various types of processes and various types of control executed by the vibration control device 10 and for processing various types of data. Further, the CPU DEV 1 is a control device for controlling hardware of the PC 10.

The storage device DEV 2 stores data, a program, a configured value, etc., used by the vibration control device 10. The storage device DEV 2 may be a memory, etc. Note that the storage device DEV 2 may be provided with an auxiliary storage device, etc., such as a hard disk.

The input device DEV 3 is a device for receiving an operation for inputting a command, a parameter, etc., by a user using the vibration control device 10. Specifically, the input device DEV 3 is, for example, a keyboard, a mouse, or a combination thereof.

The output device DEV 4 is a display device, etc., for outputting, by characters, images, or combination thereof, a processing result to a user who is using the vibration control device 10. Specifically, the output device DEV 4 is a display, etc.

Note that the input device DEV 3 and the output device DEV 4 may be a touch panel, etc., in which the input device DEV 3 and the output device DEV 4 are integrated.

The input/output I/F DEV 5 transmits various types of data, signals, etc., to and receives various types of data, signals, etc., from an external device that is connected through a network or a cable, etc. For example, the input/output DEV 5 is a LAN (Local Area Network) port, a USB (Universal Serial Bus) port, or combination thereof. Note that the input/output I/F DEV 5 is not limited to a wired line; and the input/output I/F DEV 5 may be an I/F of Bluetooth (registered trademark), etc., for wirelessly communicating with an external device. Alternatively, the input/output I/F DEV 5 may be a PCIe (Peripheral Component Interconnect Express), etc.; and the input/output DEV 5 may be an I/F connected to an electronic circuit board, etc., for inputting and outputting data and signals through the electronic circuit board, etc.

Note that the vibration control device 10 may be configured to further include an auxiliary device for assisting processing by each hardware resource. Further, the vibration control device 10 may further include an internal or external device for processing respective processes in parallel, redundantly, or in a distributed manner. Furthermore, the vibration control device 10 may be formed of a plurality of information processing devices.

[Example of the Overall Processing]

FIG. 3 is a flowchart illustrating an example of the overall processing by the vibration control device according to the embodiment of the present invention.

[Example of Calculating, by Buffering, a Delay Value of a Tip Position of an Object (Step S101)]

At step S101, the vibration control device calculates, by buffering, a delay value of a tip position of an object.

FIG. 4 is a schematic diagram illustrating an example of a multi-inertial resonance system modeled by the vibration control device according to the embodiment of the present invention. In the following, as depicted, a model is described such that, in a linear motion system in which an actuator, such as the motor 15, is located at a boundary, a plurality of mass systems (Mass) is coupled, each of which has mass m. Note that, in the depicted model, it is assumed that each mass system (Mass) is coupled with a spring, which is an example of an elastic system. Further, in the depicted model, it is assumed that each spring has a spring constant k. Additionally, in the model, each positional shift is denoted as a positional shift q and the length of the whole system obtained by adding the respective positional shifts q is defined to be the total length L. Furthermore, the suffix of the positional shift q indicates a corresponding mass system number, where the mass system number i satisfies $0<i<N$; and when the mass system number i is "m," the motor 15 is indicated. Note that, in the following description, the depicted linear motion system is exemplified and described; however, an object to be the control target is not limited to the linear motion system, and a rotation system, etc., may be a control target, similarly.

In the following, an example of a model of a multi-inertia resonance system is described, which represents the depicted linear motion system. In this example, the equations of motion of the respective mass systems (Mass) can be represented as the following formula (1):

[Expression 1]

$$m\ddot{q}_1 = k(q_m - q_1) - k(q_1 - q_2) \quad (1)$$
$$\vdots$$
$$m\ddot{q}_i = k(q_{i-1} - q_i) - k(q_i - q_{i+1})$$
$$\vdots$$
$$m\ddot{q}_i = k(q_{N-1} - q_N)$$

For the above-described equations (1), the boundary conditions are as the formula (2) and the formula (3) described below.

[Expression 2]

$$q_0 = q_m \quad (2)$$

[Expression 3]

$$q_{N+1} = q_N \quad (3)$$

By using the boundary conditions indicated in above-described (2) and above-described (3), the equation of motion of each mass system (Mass) can be represented by the formula (4) described below:

[Expression 4]

$$m\ddot{q}_i = k(q_{i-1} - 2q_i + q_{i+1}) \quad (4)$$

Here, in order to introduce a notion of distance into the multi-inertial resonance system, suppose that the length of the spring is the spring length "a." In this case, the total length L is a finite value, and "L=(N−1)a." As a result, for a sufficiently large value of "N," the spring length "a" becomes an infinitesimal value. Thus, the positional shift of the mass system number i at a time t can be represented as the formula (5) described below.

[Expression 5]

$$q_i(t) = q(t, ia) \quad (5)$$

Based on the above-described formula (5), if it is assumed that the positional shift at a spatial position x is "x=ia," it can be represented as the formula (6) described below:

[Expression 6]

$$q_i(t) = q(t, x) \quad (6)$$

As the right side of the above-described formula (6) is a quadratic function, the left side of the above-described formula (6) that represents the equation of motion of the mass system number i can be represented as the formula (7) described below:

[Expression 7]

$$m\ddot{q} = m \frac{\partial^2 q(t, x)}{\partial t^2} \quad (7)$$

The right side can be represented as the formula (8) described below based on the above-described formula (4) and the above-described formula (6):

[Expression 8]

$$k(q_{i-1} - 2q_i + q_{i+1}) = ka^2 \frac{q(t, x-a) - 2\,q(t, x) + q(t, x+a)}{a^2} \quad (8)$$

In the above-described formula (8), if "N→∞," i.e., "a→0," the formula (9) described below can be obtained:

[Expression 9]

$$\lim_{a \to 0} \frac{q(t, x-a) - 2\,q(t, x) + q(t, x+a)}{a^2} = \frac{\partial^2 q(t, x)}{\partial x^2} \quad (9)$$

From the above-described formula (7) and the above-described formula (9), the wave equation represented by the formula (10) described below can be derived:

[Expression 10]

$$\frac{\partial^2 q(t, x)}{\partial t^2} = c^2 \frac{\partial^2 q(t, x)}{\partial x^2} \quad (10)$$

In the above-described formula (10), q(t, x) represents a displacement at a time t and at a spatial position x. Further, in the above-described formula (10), c represents propagation velocity of the wave and can be represented as the formula (11) described below:

$$c = \sqrt{\frac{ka^2}{m}} \quad (11)$$

Figure 6:
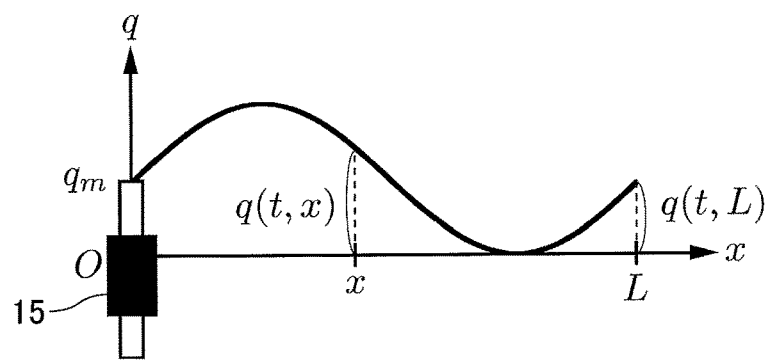
FIG. 6 is a diagram illustrating an example of a mechanical resonance system modeled by a wave equation according to the embodiment of the present invention.

FIG. 6 is a diagram illustrating an example of a mechanical resonance system modeled by the wave equation according to the embodiment of the present invention. At the depicted mechanical resonance system, suppose that all the mass systems are stationary in the initial condition. This initial condition can be represented by the formula (12) and the formula (13) described below:

[Expression 12]

$$q(0, x) = 0 \quad (12)$$

[Expression 13]

$$\frac{\partial q(0, x)}{\partial x} = 0 \quad (13)$$

Further, the boundary conditions can be represented as the formula (13) and the formula (14) described below:

[Expression 14]

$$q(t, 0) = q_m \quad (14)$$

[Expression 15]

$$\frac{\partial q(t, L)}{\partial x} = 0 \quad (15)$$

The above-described formula (14) represents a position input by the actuator at "x=0." In this case, it is assumed that the actuator implements a disturbance observer and the actuator is capable of generating a position input regardless of the condition of a load.

Further, the above-described formula (15) represents a boundary condition for setting a free end at "x=L."

Next, a transfer function is introduced, which is from a position input to a positional shift at the spatial position x. First, by applying Laplace transformation under the initial conditions shown in the above-described formula (12) and the above-described formula (13), respectively, the wave equation shown in the formula (10) can be represented as the formula (16) described below.

[Expression 16]

$$s^2 Q(s, x) = c^2 \frac{\partial^2 Q(s, x)}{\partial x^2} \quad (16)$$

Note that, in the above-described formula (16), s is a Laplace operator. Further, as the above-described formula (16) is a second order ordinary differential equation with respect to spatial differentiation, the vibration control device can analytically solve the above-described formula (16).

Then, by using the boundary conditions shown in the above-described formula (14) and the above-described formula (15), respectively, the transfer function from the position input to the position "x=L" can be represented, for example, as the formula (17) described below:

[Expression 17]

$$G(s, L) = \frac{Q(s, L)}{Q_m}$$
$$= \frac{2e^{-\frac{L}{c}s}}{1 + e^{-\frac{2L}{c}s}} \quad (17)$$

From the transfer function represented by the above-described formula (17), it can be seen that the transfer function of the wave equation includes a dead time component. Especially, in the transfer function of the wave equation, as the characteristic polynomial includes the dead time component, it can be seen that the response involves a vibration.

Figure 7:
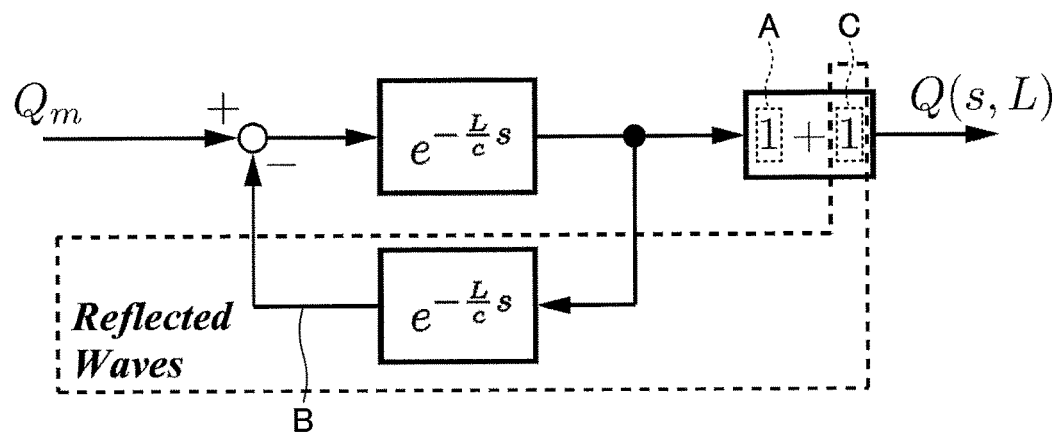
FIG. 7 is a block diagram illustrating an example of a transfer function of the wave equation according to the embodiment of the present invention.

FIG. 7 is a block diagram illustrating an example of the transfer function of the wave equation according to the embodiment of the present invention. Namely, FIG. 7 illustrates the example of the transfer function of the wave equation represented by the above-described formula (17) in terms of a block diagram.

In FIG. 7, "A" represents a traveling wave, "B" represents a reflected wave, and "C" represents a reflected wave. First, the traveling wave A generates the reflected wave C at the position "x=L." Note that, the two waves, which are the traveling wave A and the reflected wave C, overlap instantaneously. Additionally, the reflected wave B that is generated by the traveling wave A and reflected at the position "x=L" propagates to the position "x=0" and overlaps with the input. Thus, the reflected wave B includes a dead time component, and negative feedback is provided, so that the positional shift at each position provides an oscillatory response. Therefore, if control is performed so as to remove the reflected wave, the vibration control device can control the multi-inertial resonance system so that the vibration of the control target can be reduced.

Here, first, the reflected wave is defined. By modifying the above-described formula (17), it can be represented as the formula (18) described below.

[Expression 18]

$$Q(s, L) = e^{-\frac{L}{c}s}\left[2Q_m - e^{-\frac{L}{c}s}Q(s, L)\right] \quad (18)$$

Based on the above-described formula (18), the reflected wave can be defined as the formula (19) described below.

[Expression 19]

$$Q_{rfl} = e^{-\frac{L}{c}s}Q(s, L) \quad (19)$$

The reflected wave B corresponds to the wave represented by the above-described formula (19), and includes a dead time component. Thus, it can be said that, by the wave represented by the above-described formula (19), the negative feedback is provided.

In this regard, the vibration control device calculates a delay value of the wave represented by the above-described formula (19), and controls the multi-inertia resonance system so as to cancel the reflected wave B by feedforward compensation.

For example, in the depicted model, the delay value is calculated as the formula (20) described below.

[Expression 20]

$$Q_d(s, L) = e^{-\frac{L_n}{c_n}s}Q(s, L) \quad (20)$$

Namely, the vibration control device refers to the tip position $e^{-Ts}Q(S, L)$ obtained at the time "t-T," in the above-described formula (20). Note that, in the above-described formula (20), "n" represents a nominal value. The same notation is applied below.

The above-described formula (20) is an example of a case in which the machine TAG (cf. FIG. 1) that is the control target is a model including an infinite number of mass systems and elastic systems connecting the mass systems, i.e., the multi-inertial resonance system. As in this example, by modeling the multi-inertial resonance system based on the wave equation, the vibration control device can control a flexible object, such as a human body, a machine, a robot, etc. Here, the vibration control device may model a two-inertia resonance system.

FIG. 5 is a schematic diagram illustrating an example of the two-inertia resonance system modeled by the vibration control device according to the embodiment of the present invention. As depicted, the vibration control device may model an object to be controlled with two mass systems and one elastic system connecting the mass systems.

Namely, the delay value differs depending on a model, etc., representing an object, such as those illustrated in FIG. 4 and FIG. 5, so that the delay value is not limited to the value calculated by the above-described formula (20).

[Example of Calculation of an Inverse System Output (Step S102)]

Referring back to FIG. 3, at step S102, the vibration control device calculates an inverse system output.

Figure 8:
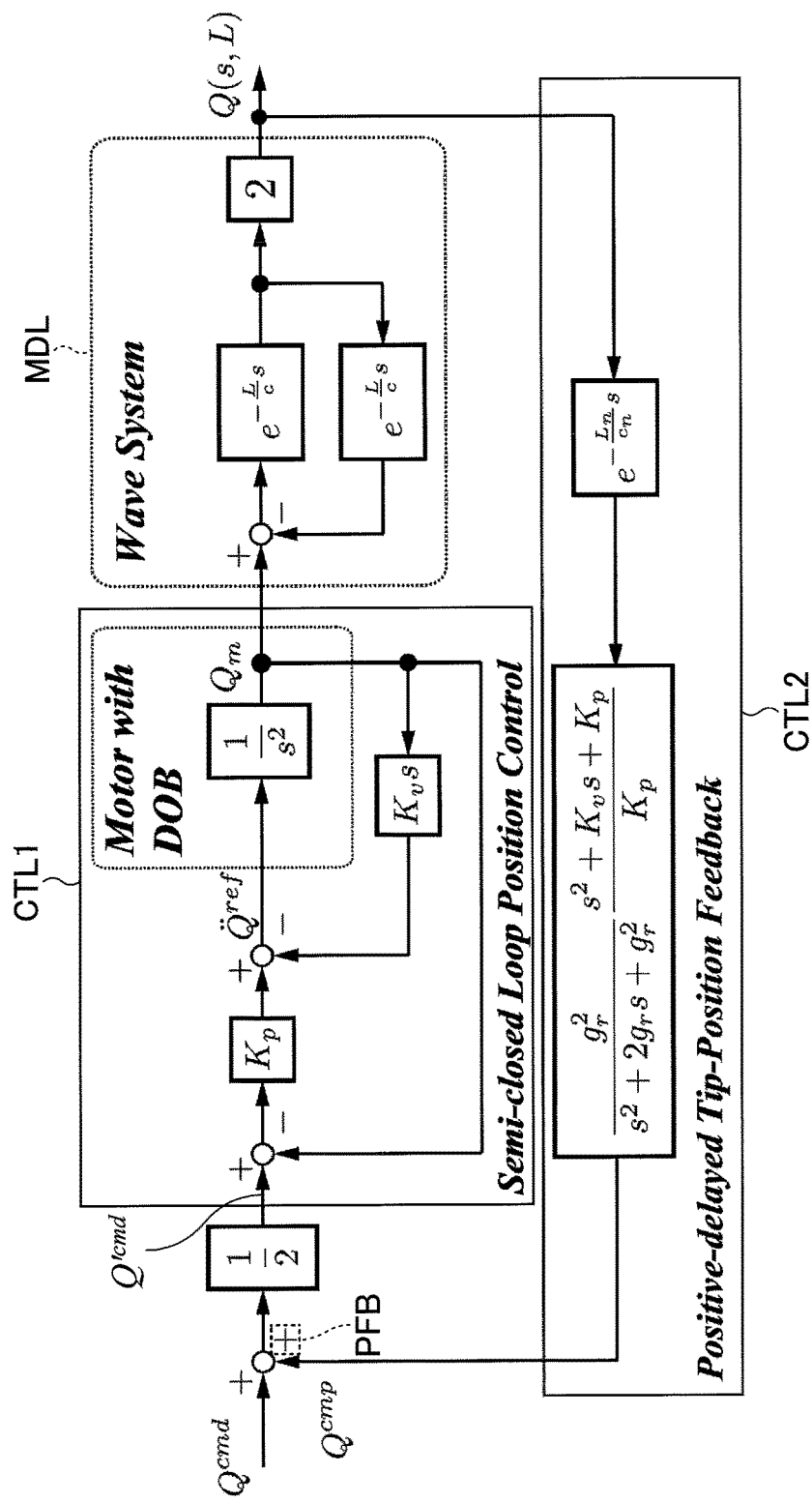
FIG. 8 is a block diagram illustrating an example of an entire process by the vibration control device according to the embodiment of the present invention.

FIG. 8 is a block diagram illustrating an example of overall processing by the vibration control device according to the embodiment of the present invention. As depicted, the vibration control device executes semi-closed position control CTL1 in an inner loop. In the position control CTL1, for example, P control or PI control is executed on the actuator.

Further, as depicted, the vibration control device executes, in an out loop, feedback control CTL2 to be the control for suppressing a vibration, so that the vibration of the control target is reduced. Here, the feedback control CTL2 is executed by providing positive feedback PFB, as depicted.

FIG. 8 is an example in which an object of a multi-inertial resonance system is to be controlled, in which the object is modeled by the model MDL.

The inverse system output is a compensation value to be fed back as the positive feedback by the feedback control CLT2 so as to cancel the reflected wave B illustrated in FIG. 7, and it can be calculated as the formula (21) described below.

[Expression 21]

$$Q^{cmp} = \frac{g_r^2}{s^2 + 2g_r s + g_r^2} \frac{s^2 + K_v s + K_p}{K_p} \times e^{-\frac{L_n}{c_n}s}Q(s, L) \quad (21)$$

Note that, in the above-described formula (21), the element represented by the formula (22) described below is a low-pass filter element.

[Expression 22]

$$\frac{g_r^2}{s^2 + 2g_r s + g_r^2} \quad (22)$$

Additionally, in the above-described formula (21), the element represented by the formula (23) described below is an inverse system element of the position control CTL1 illustrated in FIG. 8. Accordingly, the formula (23) described below may be changed depending on the control in the position control CTL1.

[Expression 23]

$$\frac{s^2 + K_v s + K_p}{K_p} \quad (23)$$

When the compensation value calculated by the above-described formula (21) is provided as the positive feedback PFB, the vibration control device can execute control so as to reduce the vibration of the object. Namely, when the inverse system output is calculated as the above-described formula (21), the vibration control device can control the object so that a phase delay is small and the vibration of the control target is reduced by cancelling the reflected wave.

In the calculation of the above-described formula (21), etc., a nominal value of the wave propagation time is defined, for example, as the formula (24) described below.

[Expression 24]

$$\frac{L_n}{c_n} = \frac{\pi}{2\,\omega_1} \quad (24)$$

Here, $\omega_1$ represents a first order resonance frequency.

[Example of Correcting a Command Value by Positive Feedback Compensation (Step S103)]

Referring back to FIG. 3, at step S103, the vibration control device corrects a command value by the positive feedback. Namely, the vibration control device corrects the command value output by the inverse system output calculated by the above-described formula (21). Specifically, the command value is corrected as shown in the formula (25) described below. For example, the vibration control device adjusts the value to be fed back by the forward gain "½," as described in the formula (25) below.

[Expression 25]

$$Q'^{cmd} = \frac{1}{2}(Q^{cmd} + Q^{cmp}) \quad (25)$$

Namely, the command value corrected as shown in the above-described formula (25) is input to the position control CTL1 shown in FIG. 8.

[Example of Calculating an Acceleration Reference Value by a Position Controller (Step S104)]

At step S104, the vibration control device calculates an acceleration reference value by a position controller. Specifically, when the command value corrected as shown in the above-described formula (25) is input to the position control CTL1 illustrated in FIG. 8, the acceleration reference value is calculated in the position control CTL1 as the formula (26) described below.

[Expression 26]

$$\ddot{Q}^{ref} = K_p(Q^{cmd} - Q_m) - K_v s Q_m \quad (26)$$

Here, if, in the inverse system output, the cutoff angular frequency $g_r$ is sufficiently large, i.e., an error in the nominal wave propagation time is small, the transfer function from the position command value to the tip position can be represented as the formula (27) described below.

[Expression 27]

$$\frac{Q(s,L)}{Q^{cmd}} = \frac{K_p}{s^2 + K_v s + K_p} e^{-\frac{L}{c}s} \quad (27)$$

It can be seen that, in the above-described formula (27), no dead time component is included in the denominator. Accordingly, when the control is executed as the transfer function represented in the above-described formula (27), the vibration control device can control the object so that the resonance caused by the dead time component is reduced.

[Example of Conversion from the Acceleration into an Electric Current Value (Step S105)]

At step S105, the vibration control device converts the acceleration into an electric current value. Specifically, the vibration control device converts the acceleration reference value calculated by the above-described formula (26) into the electric current value, as shown in the formula (28) described below.

[Expression 28]

$$I^{ref} = \frac{M_n}{K_{tn}} \ddot{Q}^{ref} \quad (28)$$

Here, in the above-described formula (28), "$M_n$" represents the moment of inertial of the motor. Additionally, in the above-described formula (28), "$K_{tn}$" represents the nominal value of the torque constant. The "$M_n$" and "$K_{tn}$" are, for example, values defined by referring to the catalog values, etc.

[Example of Addition of the Disturbance Compensation Value (Step S106)]

At step S106, the vibration control device adds a disturbance compensation value. Specifically, in order to compensate for the disturbance in the electric current value calculated by the above-described formula (28), the vibration control device adds, for example, the disturbance compensation value as shown in the formula (29) described below. Namely, the vibration control device compensates for the disturbance by adding the disturbance compensation value. However, the method of compensating for the disturbance may be implemented by a method other than the addition of the disturbance compensation value.

[Expression 29]

$$I'^{ref} = I^{ref} + I_{dis}^{cmp} \quad (29)$$

Note that, in the above-described formula (29), "$I^{cmp}_{dis}$" represents the compensation electric current value of the disturbance observer. As for the "$I^{cmp}_{dis}$", a commonly used known value, etc., is used. For example, by applying a low-pass filter to a difference between a torque reference value and a value obtained by multiplying the nominal inertia to an acceleration response value, the disturbance torque is estimated. Then, it can be calculated by dividing the estimated disturbance torque by the nominal torque constant.

[Example of Calculation of a Voltage Command Value to the DA Converter (Step S107)]

At step S107, the vibration control device calculates a voltage command value to the DA converter. Specifically, the voltage command value to the DA converter is calculated, for example, as shown in the formula (30) described below.

[Expression 30]

$$V^{ref} = G_{conv} I^{ref} \quad (30)$$

Note that, in the above-described formula (30), "$G_{conv}$" represents current/voltage conversion gain, and "$G_{conv}$" is defined, for example, based on a catalog value of a servo amplifier.

As shown in the above-described formula (30), the voltage command value to the DA converter is calculated based on the value calculated by the above-described formula (29). Next, the voltage command value to the DA converter calculated by the above-described formula (30) is output to the DA converter.

[Example of Output by the DA Converter (Step S108)]

At step S108, the vibration control device performs output, by the DA converter, based on the voltage command value. Specifically, the vibration control device performs output from the DA converter to the motor driver based on the voltage command value to the DA converter calculated by the above-described formula (30).

When the output from the DA converter is performed, the motor 15 illustrated in FIG. 1 moves based on the control by the DA converter. In accordance with this, the machine TAG, etc., illustrated in FIG. 1 is controlled.

[Example of the Object to be Controlled]

Figure 9:
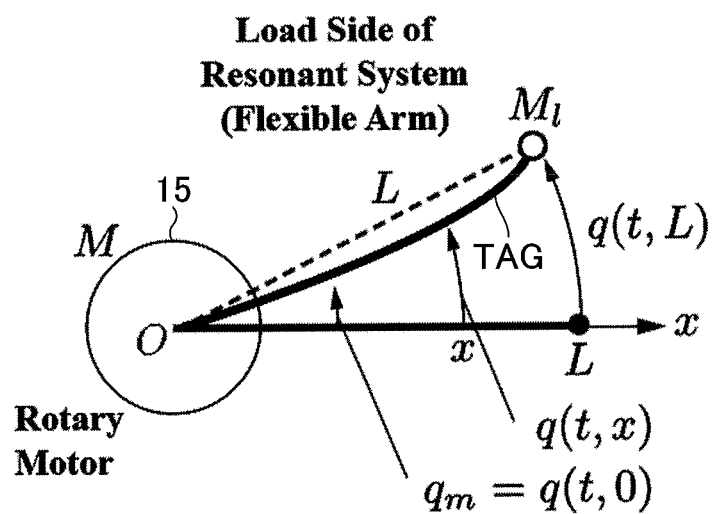
FIG. 9 is a schematic diagram illustrating an example of an object that is to be a control target by the vibration control device according to the embodiment of the present invention.

FIG. 9 is a schematic diagram illustrating an example of the object to be controlled by the vibration control device according to the embodiment of the present invention. For example, the vibration control device controls the motor 15 to control a motion of the machine TAG. The machine TAG is, for example, a flexible manipulator in the space field.

In the space field, in order to reduce the transportation cost for transporting the manipulator to space or to save energy, the manipulator is often reduced in weight. Accordingly, due to weight reduction, the stiffness of the manipulator may be lowered. When the manipulator with low stiffness is moved, higher order vibrations are often caused. In this regard, when the vibration control device controls the manipulator as shown in FIG. 8, etc., the vibration control device can control the manipulator so that the vibration of the manipulator to be controlled is reduced.

Figure 10:
FIG. 10 is a schematic diagram illustrating an example of a tip position of an object measured in the embodiment of the present invention.

FIG. 10 is a schematic diagram illustrating an example of a tip position of the object measured in the embodiment according to the present invention. It is desirable that the position TAGP measured by the sensor 17 illustrated in FIG. 1 is a tip of the machine TAG. Specifically, when the object to be controlled is the manipulator, etc., illustrated in FIG. 9, assuming that the total length of the manipulator is the total length L, the tip is the end that is different from the end to which the motor 15 is connected. Namely, in FIG. 10, assuming that the end to which the motor 15 is connected is "x=O," the tip is the position "x=L".

For example, if the sensor 17 is a laser diode and a position detection element, the laser diode is attached to the depicted position TAGP, i.e., the position "x=L." In this regard, the positional shift of the position TAGP is measured by the position detection element.

Note that the position TAGP, i.e., the tip is not limited to the position "x=L," and it may be a position that can approximate the tip. For example, the position TAGP may be any position within the depicted range from "x=(8/10) L" to "x=L."

[Example of Evaluation Result of Frequency Characteristics]

In the description above, physical characteristics due to the positive feedback are described. In the following description, the frequency characteristics are described. First, the frequency characteristics of the positive feedback excluding the inverse system element can be represented by the formula (31) and the formula (32) described below.

[Expression 31]

$$\left| -e^{-\frac{L_n}{c_n}s} \right| = 1 \quad (31)$$

[Expression 32]

$$\angle -e^{-\frac{L_n}{c_n}s} = \pi - \frac{\pi}{2\omega_1}\omega \quad (31)$$

Note that, the phase characteristic is an example in which the nominal value of the wave propagation time shown in the above-described formula (24) is used.

From the above-described formula (31) and the above-described formula (32), it can be said that the positive feedback PFB illustrated in FIG. 8 has a characteristic such that the gain is unchanged and only the phase is changed.

Figure 11:
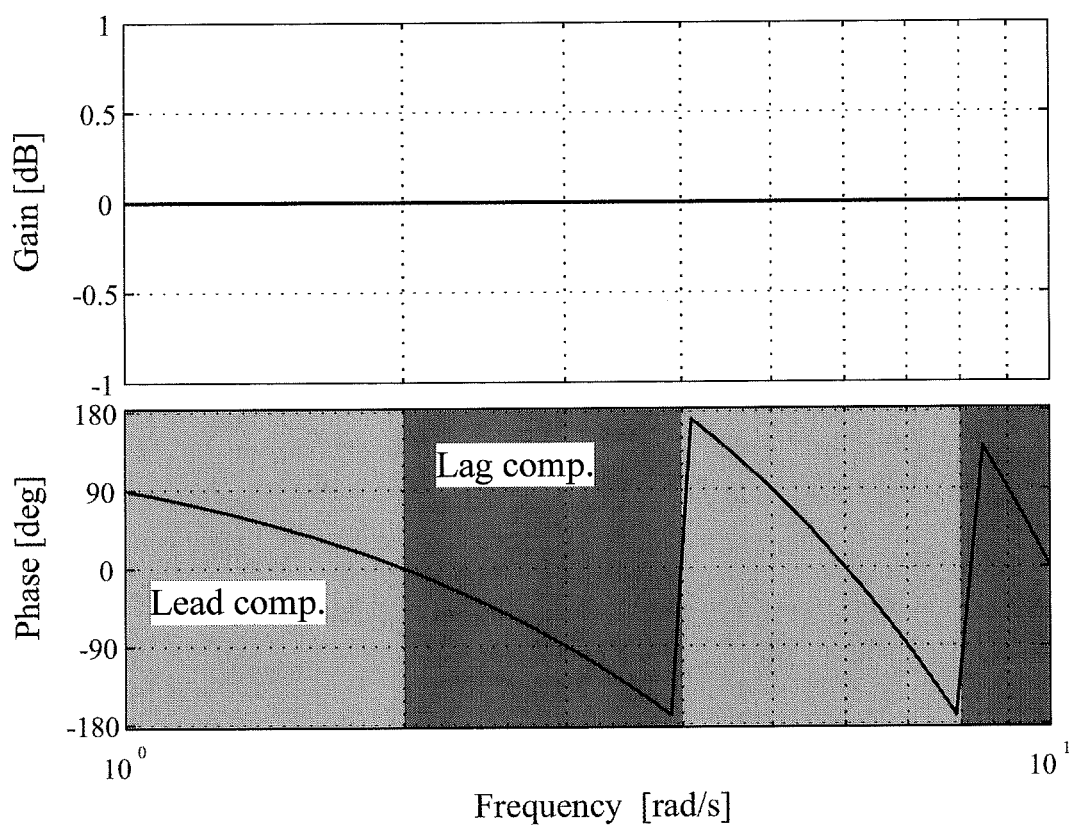
FIG. 11 is a bode diagram illustrating an example of a frequency characteristic of positive feedback according to the embodiment of the present invention.

FIG. 11 is a bode diagram illustrating an example of the frequency characteristics of the positive feedback according to the embodiment of the present invention. Here, FIG. 11 is the example in which the first order resonance frequency is set to 1 rad/s.

As depicted, the characteristic of the positive feedback PFB (cf. FIG. 8) is a characteristic such that a phase advance characteristic in which the phase advances and a phase delay characteristic in which the phase is delayed alternately occur repeatedly. Accordingly, by the positive feedback PFB, the vibration control device can execute 90 degree phase advance compensation for odd-order resonance frequencies. At the same time, by the positive feedback PFB, the vibration control device can execute −90 degree phase delay compensation for even-order resonance frequencies.

Figure 12:
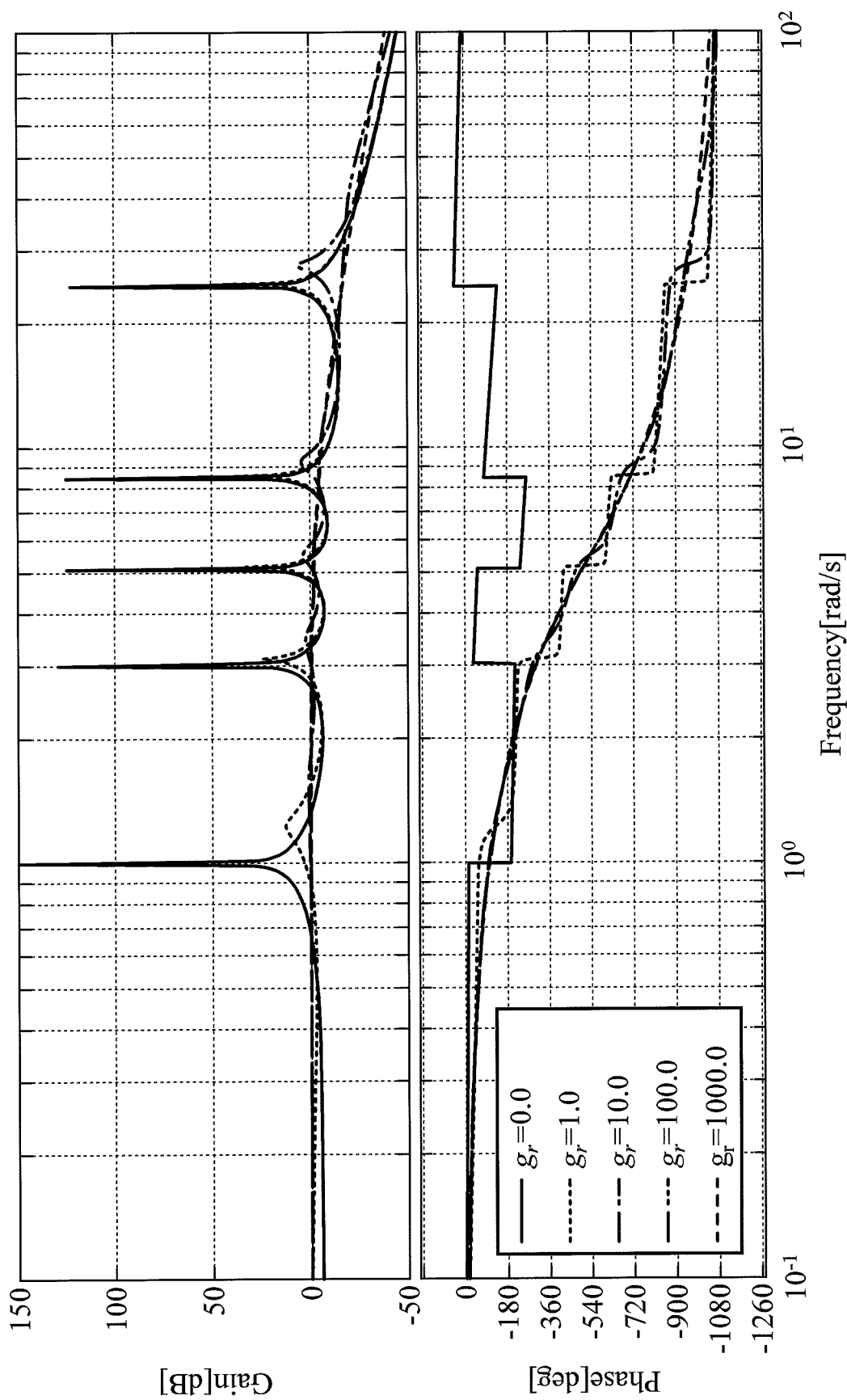
FIG. 12 is a bode diagram illustrating an example of the transfer function when a cutoff angular frequency is varied in the embodiment of the present invention.

FIG. 12 is a bode diagram illustrating an example of the transfer function when the cutoff angular frequency is varied in the embodiment of the present invention. FIG. 12 illustrates transfer functions for cases in which the cutoff angular frequency that is cut off by the low-pass filter element shown in the above-described formula (22) is varied to be "0.0," "1.0," "10.0," "100.0," and "1000.0," respectively.

As depicted, when the cutoff angular frequency is "0.0," the processing result is close to that of the case in which no compensation by the positive feedback PFB (cf. FIG. 8) is performed, which is an example in which the resonance occurs. In contrast, the settings in which the cutoff frequency is increased from "0.0" to be "1.0," "10.0," "100.0," and "1000.0," respectively, are examples in which the peak of the amplitude of the resonance is attenuated. From this result, it can be seen that, when the setting is made to increase the cutoff angular frequency, the vibration of the object to be controlled is decreased. Namely, by broadening the cutoff angular frequency, the vibration control device can attenuate the vibration of the manipulator in many cases, and the vibration control device can control the manipulator while reducing the vibration of the manipulator.

Accordingly, when the vibration control device controls the manipulator based on the configured cutoff angular frequency, the peak of the amplitude of the resonance is attenuated, and the vibration of the manipulator is reduced. Consequently, the vibration control device can control the manipulator so that the vibration of the controlled manipulator is reduced.

[Example of the Processing Result]

Figure 13:
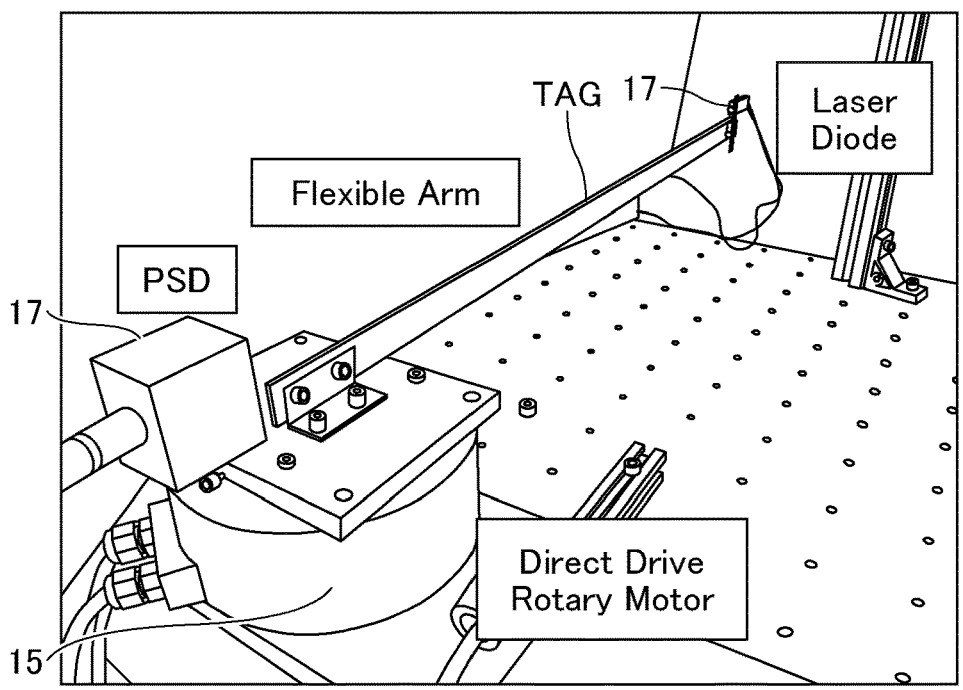
FIG. 13 is a diagram illustrating an overall configuration with which a whole process is executed by the vibration control device according to the embodiment of the present invention.

FIG. 13 is a diagram showing an overall configuration, in which the whole processing is executed by the vibration control device according to the embodiment of the present invention. The processing result is described below by exemplifying the processing result of a case in which a flexible arm as the machine TAG is controlled by the motor 15 as depicted.

In the depicted flexible arm, specifically, the linear density was 0.27 kg/m, and a nominal value of a cross-sectional moment of area was 0.833 mm$^4$. Thus, compared to a generic aluminum frame, etc., the weight of the flexible arm is light, so that the motor 15 can move the flexible arm even if the driving torque of the motor 15 is relatively small. However, as the weight of the flexible arm is light, the stiffness is low. If the flexible arm is moved by controlling it by a usual method, resonance tends to occur. In this regard, the following shows a result of performing the whole process as shown in FIG. 8 by the vibration control device according to the embodiment of the present invention.

Figure 14:
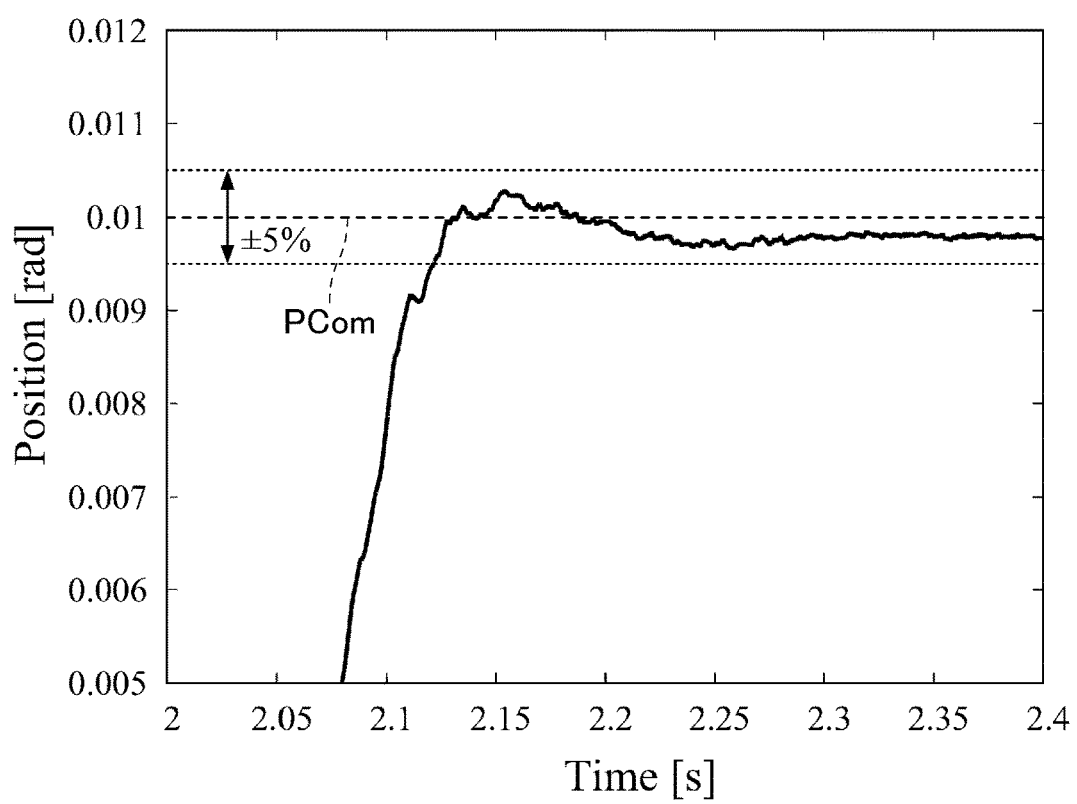
FIG. 14 is a diagram illustrating a processing result of executing the whole process by the vibration control device according to the embodiment of the present invention.

FIG. 14 is a diagram showing the processing result of performing the entire processing by the vibration control device according to the embodiment of the present invention. FIG. 14 shows a measured result, in which 0.01 rad, which was the target position PCom, was input as a position command value, and a time to move, by the vibration control device, the flexible arm shown in FIG. 13 from "0" rad, which was the initial position, to a position that was within ±5% from the target position PCom (which is referred to as the "setting time," hereinafter) was measured as the evaluation value. As depicted, the vibration control device can control the flexible arm so as to shorten the setting time.

The depicted is an example in which, even if the control target is a flexible object, such as the flexible arm, the vibration control device can control the flexible arm so as to quickly move the flexible arm to the position within ±5% from the target position PCom.

Reference Example

Figure 15:
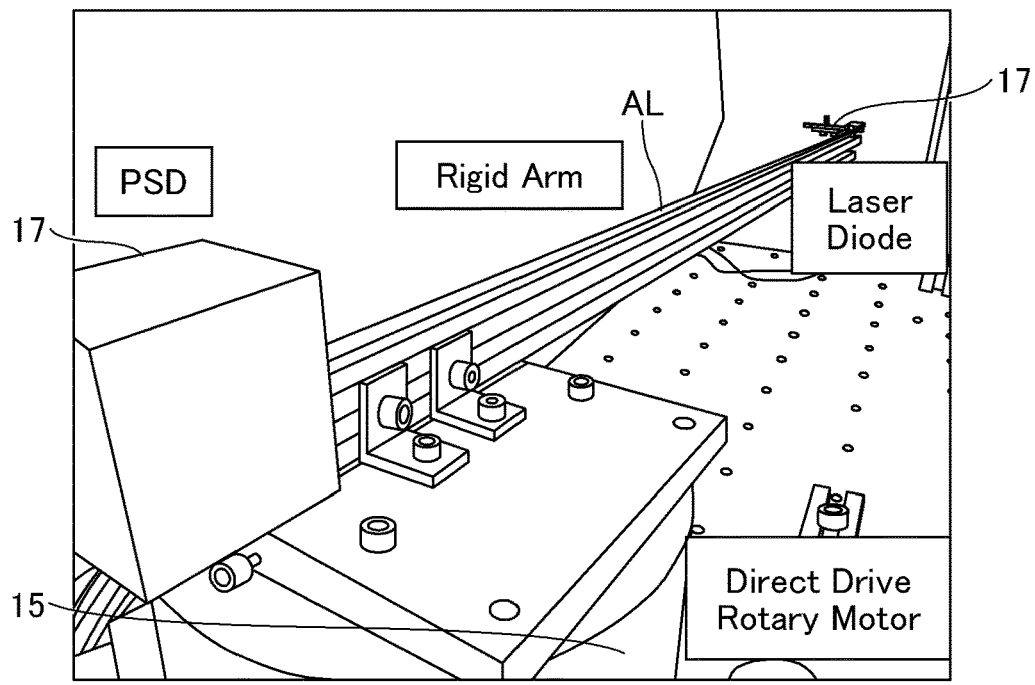
FIG. 15 is a diagram illustrating an overall configuration with which a whole process of a reference example is executed.

FIG. 15 is a diagram showing the entire configuration with which the entire processing of the reference example was executed. Compared to FIG. 13, the object to be controlled is different. In the following the difference is mainly described.

The reference example is a case in which a rigid arm LA was moved by the motor 15. Here, in the example, the control was semi-closed control in which the position and speed of the motor were fed back, respectively. In the rigid arm AL, specifically, the linear density was 0.5 kg/m, and the nominal value of the cross-sectional moment of area was 0.742×10$^4$ mm$^4$. Thus, compared to the flexible arm shown in FIG. 13, in the example, the stiffness of the rigid arm AL was sufficiently large.

Figure 16:
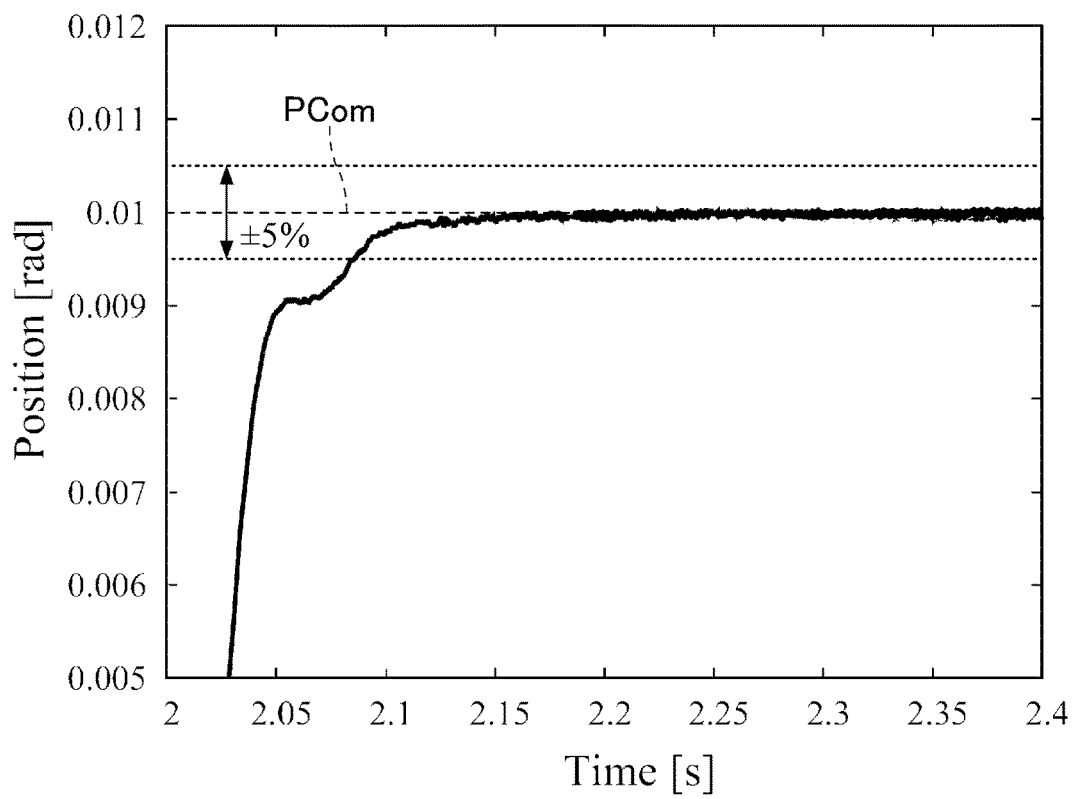
FIG. 16 is a diagram illustrating a processing result of executing the whole process of the reference example.

FIG. 16 is a diagram showing a processing result of performing the entire processing of the reference example. If the object to be controlled has sufficiently large stiffness, such as the rigid arm AL shown in FIG. 15, the object to be controlled can be controlled in a shorter setting time, as depicted.

Figure 17:
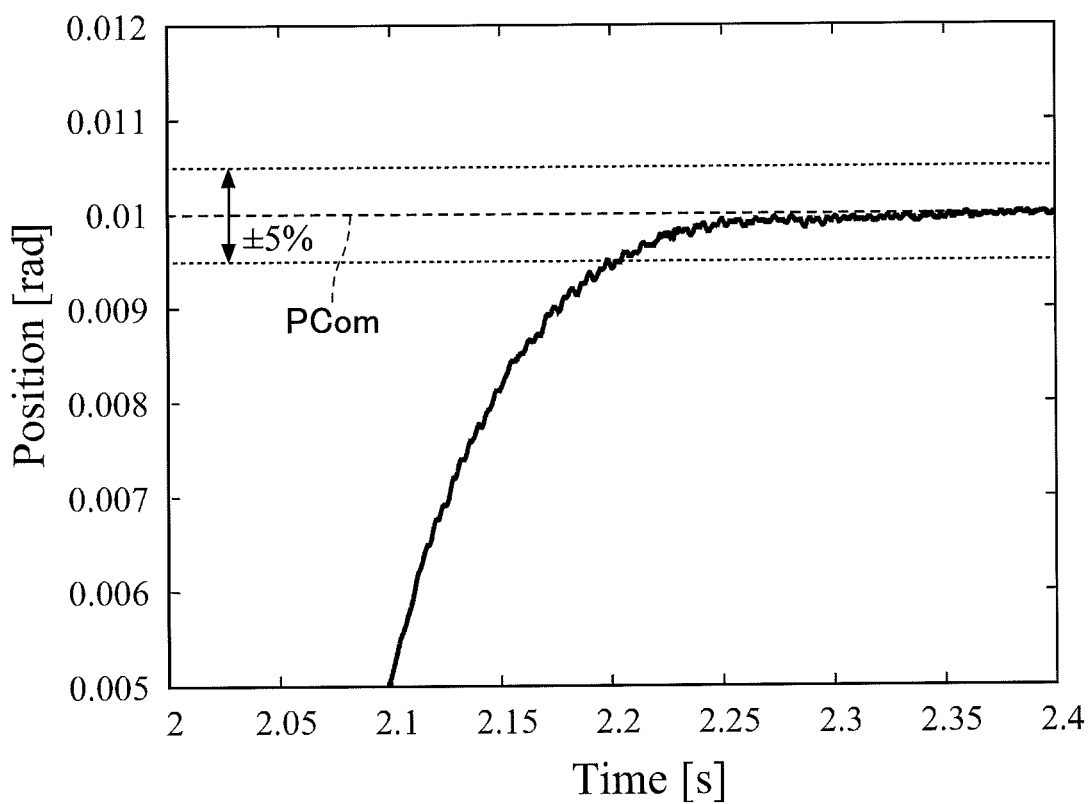
FIG. 17 is a diagram illustrating a processing result of executing the whole process of another reference example.

FIG. 17 is a diagram showing a processing result of performing the entire processing of another reference example. FIG. 17 shows the processing result according to the reference example in which the control was performed by the "resonance ratio control." As depicted, with the resonance ratio control, the result was such that the setting time was elongated.

In contrast, compared to FIG. 17, the processing result of performing the entire processing by the vibration control device according to the embodiment of the present invention was such that the setting time could be shortened by approximately 50%.

[Example of Functional Configuration]

Figure 18:
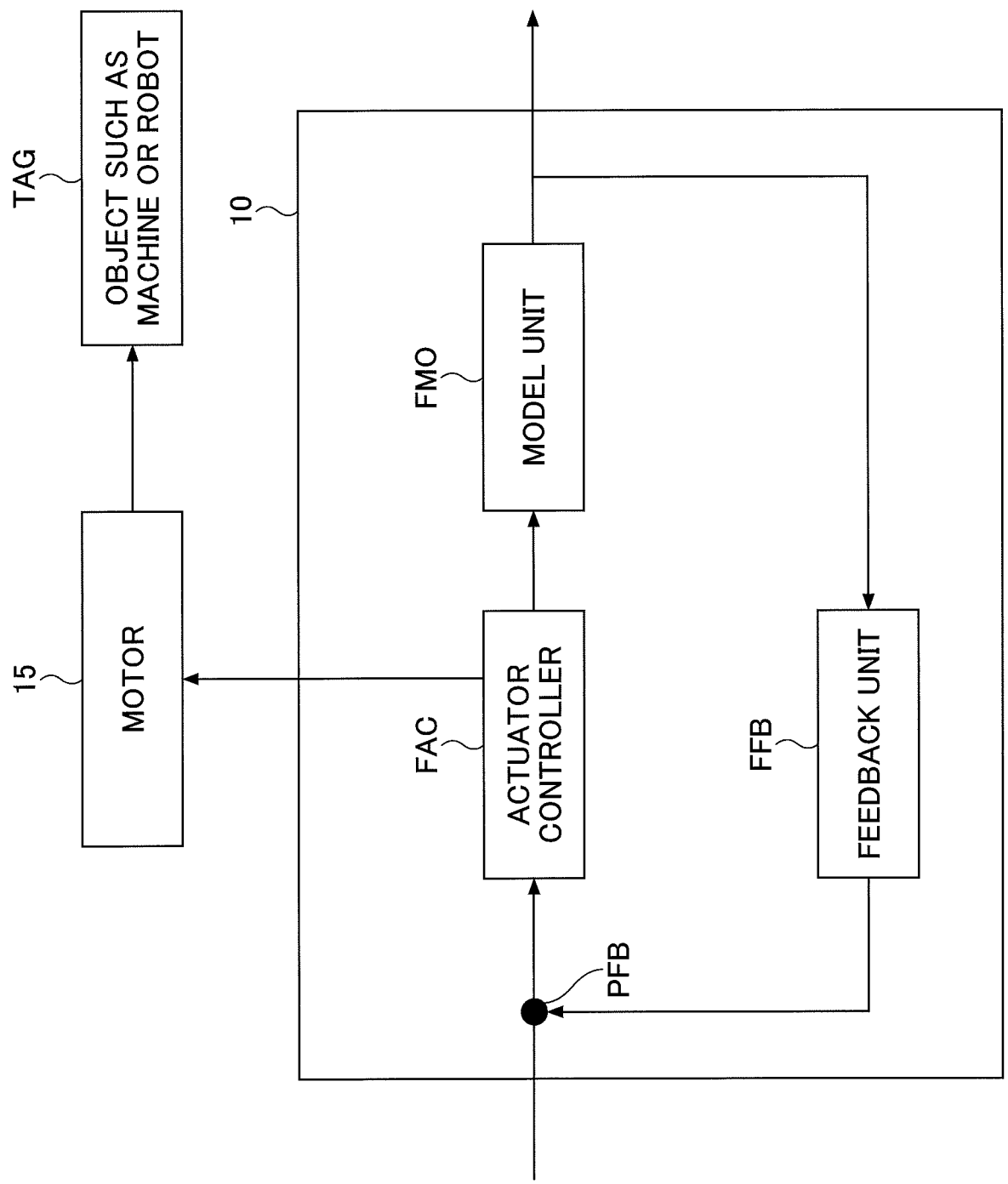
FIG. 18 is a functional block diagram illustrating an example of a functional configuration of the vibration control device according to the embodiment of the present invention.

FIG. 18 is a functional block diagram illustrating an example of a functional configuration of the vibration control device according to the embodiment of the present invention. As depicted, the vibration control device 10 includes an actuator controller FAC; a model unit FMO; and a feedback unit FFB.

The actuator controller FAC controls a position and speed of an actuator, such as the motor 15. Note that the actuator controller FAC is implemented, for example, by the CPU DEV 1 (cf. FIG. 2) and the input/output I/F DEV 5 (cf. FIG. 2).

The model unit FMO models an object, such as the machine TAG, to generate a model. Note that the model unit FMO is implemented, for example, by the CPU DEV 1, etc.

The feedback unit FFB calculates an inverse system output that is based on the model generated by the model unit FMO and the control by the actuator controller FAC, and the feedback unit FFB provides positive feedback of the position of the object based on the calculated inverse system output. Note that the feedback unit FFB is implemented, for example, by the CPU DEV 1, etc.

The vibration control device 10 controls the actuator, such as the motor 15, by the actuator controller FAC. By this control, the vibration control device 10 can move the object, such as the machine TAG.

When the object to be controlled is a lightweight manipulator, such as the flexible arm shown in FIG. 13, the vibration control device 10 generates, by the model unit FMO, a model of the multi-inertial resonance system including an infinite number of mass systems and elastic systems connecting the mass systems based on the wave equation.

Next, the vibration control device 10 calculates, by the feedback unit FFB, the inverse system output, as in the feedback control CTL2 shown in FIG. 8. Here, the vibration control device 10 calculates the inverse system output so that the low-pass element, the inverse system element, and the dead time component are included in the inverse system output. Subsequently, the vibration control device 10 provides, by the feedback unit FFB, the positive feedback PFB of the position of the object based on the calculated inverse system output. As the inverse system output cancels the reflected wave, by the positive feedback PFB by the feedback control CTL2, the vibration control device 10 can execute control so that the vibration of the control target is reduced.

Thus, by performing, by the vibration control device 10, the control, such as that of shown in FIG. 8, etc., the lightweight flexible manipulator, etc., can be caused to perform tracking operation for wideband and at high speed. Consequently, working efficiency can be enhanced for the space field or the remote operation, etc., using the lightweight flexible manipulator, etc.

Further, the vibration control device 10 may be applied to an industrial machine, such as a machine tool, a semiconductor manufacturing device, a ball screw driving table, or a galvano scanner. For the purpose of increasing speed or increasing accuracy, an industrial machine may be configured so that gain becomes high in a control system. In such a case, in order to move the industrial machine at high speed, it is necessary to perform control so as to reduce higher order mechanical resonance. Thus, by applying the vibration control device 10 to the industrial machine, etc., and controlling the industrial machine, etc., by the vibration control device 10, the industrial machine, etc., can be moved so as to reduce the vibration of the industrial machine, etc.

Additionally, the vibration control device 10 may be applied to an industrial machine or a robot system, etc., such as an industrial manipulator or an industrial positioning device. By reducing the weight of the industrial machine or the robot system, etc., an actuator, such as a motor, for moving the industrial machine or the robot system, etc., can move the the industrial machine or the robot system, etc., with small driving torque. As a result, it is possible to save energy in the industrial machine or the robot system, etc. Furthermore, in the industrial machine or the robot system, etc., a same degree of accuracy can be achieved and downsizing of the industrial machine or the robot system, etc., can be achieved.

Furthermore, the vibration control device may be applied to a flexible structure, etc.

Figure 19:
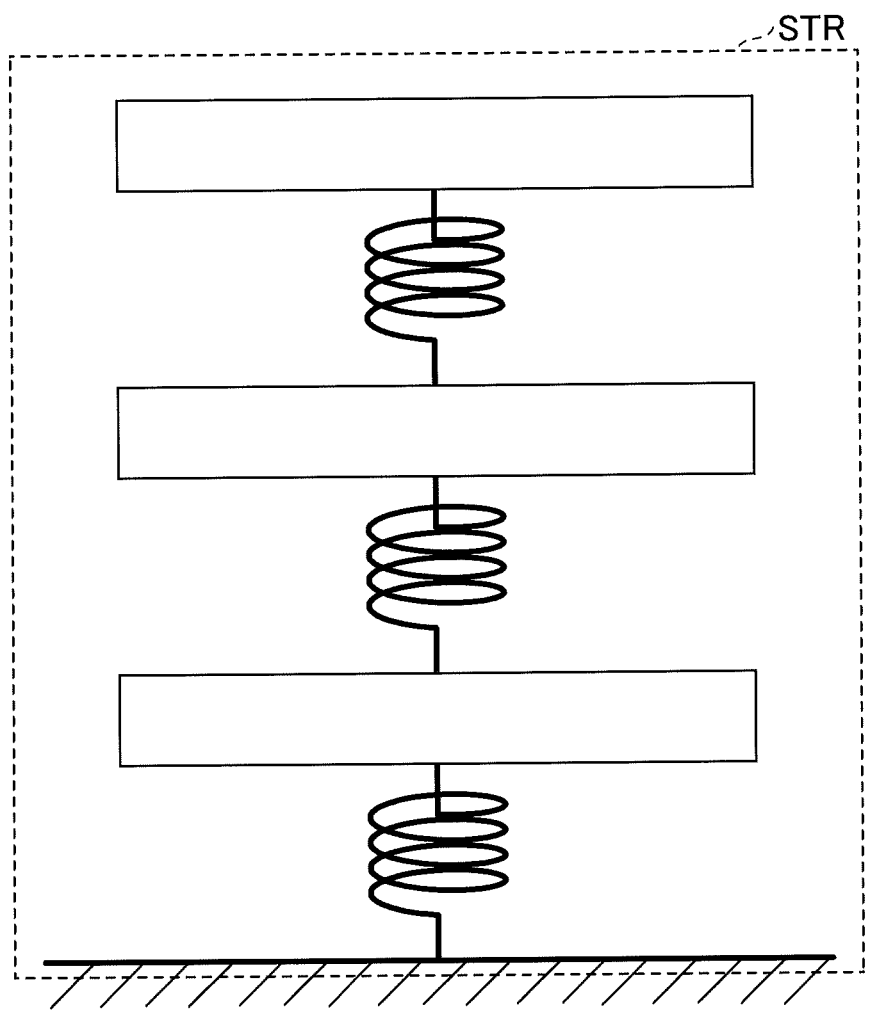
FIG. 19 is a schematic diagram illustrating an example of a structure to which the vibration control device according to the embodiment of the present invention can be applied.

FIG. 19 is a schematic diagram illustrating an example of a structure to which the vibration control device according to the embodiment of the present invention can be applied. The vibration control device may be applied, for example, to a depicted flexible structure STR. Specifically, when the vibration control device is applied to the structure STR, etc., during an earthquake, etc., the vibration control device suppresses the vibration caused by the earthquake, etc., which is received by the structure STR. As a result, the vibration control device can protect the structure STR from receiving damage, etc.

Furthermore, the vibration control device may be applied to a mobile object, such as an automobile.

Figure 20:
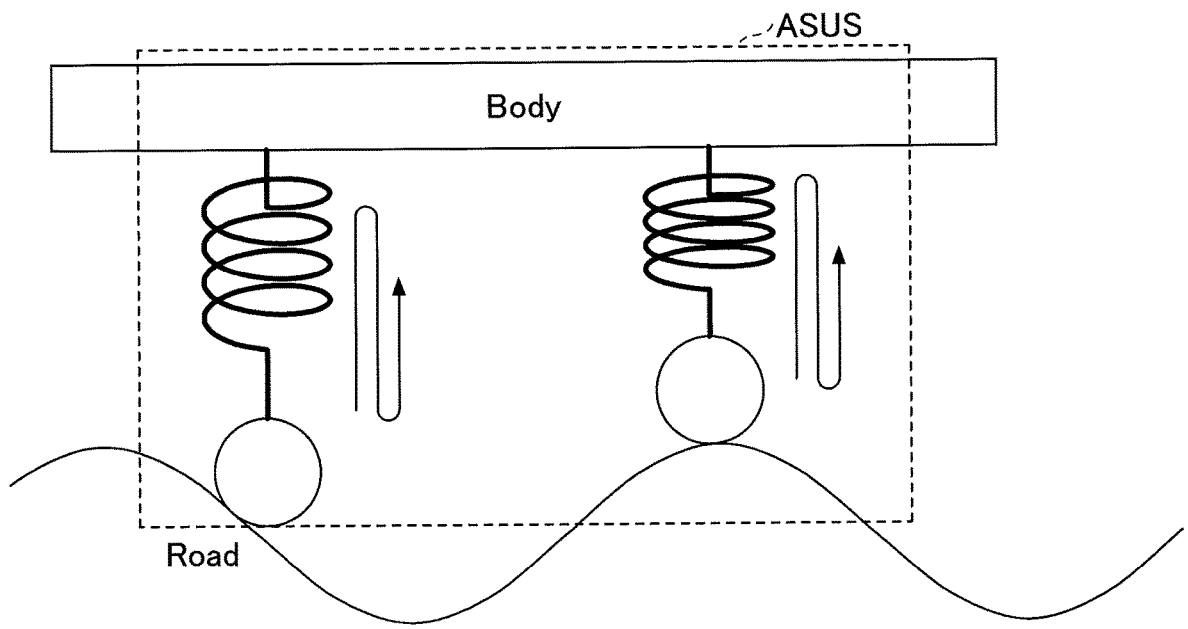
FIG. 20 is a schematic diagram illustrating an example of a moving body to which the vibration control device according to the embodiment of the present invention can be applied.

FIG. 20 is a schematic diagram illustrating an example of the mobile object to which the vibration control device according to the embodiment of the present invention can be applied. For example, the vibration control device may be applied to a depicted active suspension ASUS, etc., of the mobile object. Specifically, when the vibration control device is applied to the active suspension ASUS, etc., the vibration control device can control the vibration, etc., which is received by the mobile body from the road surface when the mobile body moves. As a result, the vibration control device can reduce the vibration, etc., received by a passenger of the mobile body, etc., so that riding comfort of the mobile body, etc., can be improved.

Furthermore, the vibration control device may be applied to a wearable motion support robot, etc., such as a robot suit.

Figure 21:
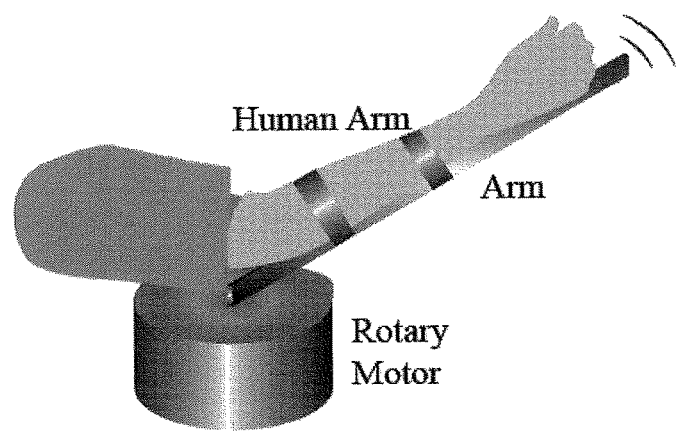
FIG. 21 is a schematic diagram illustrating an example of a wearable motion assist robot to which the vibration control device according to the embodiment of the present invention can be applied.

FIG. 21 is a schematic diagram showing an example of the wearable motion support robot to which the vibration control device according to the embodiment of the present invention can be applied. The vibration control device may be applied so that, for example, the depicted actuator of the wearable motion support robot, etc., can be controlled. As a result, the vibration control device can reduce hand movement, etc., caused by aging or muscle weakness, etc., of a person wearing the wearable motion support robot.

Furthermore, the vibration control device may be applied to a robot, etc. for performing fine work.

Figure 22:
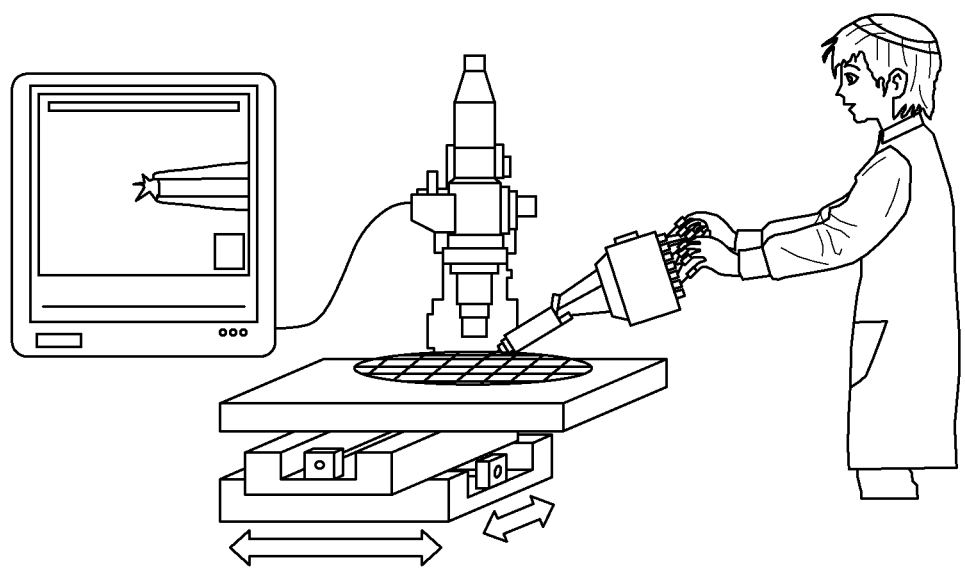
FIG. 22 is a schematic diagram illustrating an example of a robot for performing a fine work to which the vibration control device according to the embodiment of the present invention can be applied.

FIG. 22 is a schematic diagram showing an example of a robot for performing fine work to which the vibration control device according to the embodiment of the present invention can be applied. For example, the vibration control device may be applied to the depicted robot, etc., for performing fine work. As a result, the vibration control device can reduce hand movement, etc., of a person who operates the robot. Consequently, the vibration control device can enhance the work efficiency or the working accuracy of the fine work.

Note that, all or a part of the processes according to the present invention may be implemented by a program for causing a computer, such as an information processing device, to execute the procedure for implementing the processes, which is described in machine language; low-level language, such as assembler; high level language, such as C language, Java (registered trademark), or object oriented program language; or a combination thereof. Namely the program is a computer program for causing a computer, such as an information processing device, to execute each of the processes.

Further, the program may be stored and distributed in a computer readable recording medium, such as an auxiliary storage device, a magnetic tape, a magnetic disk, an optical medium, a magneto-optical disk, or a flash memory. Further, the program may be distributed through an electric communication line, such as the Internet.

Furthermore, the vibration control system provided with one or more information processing devices according to the embodiment of the present invention may transmit and receive data and signal through a network, etc., and all or a part of the processing may be processed in parallel, in a distributed manner, in a redundant manner, or a combination thereof.

[Example of the Result of the Reference Experiment]

In the following, an experimental result is described in which the vibration control device according to the embodiment of the present invention was compared with a vibration control device according to a reference example, which is described below. Here, the experiment was such that a flexible arm was operated using rotational driving of a motor. First, the vibration control device is described that was used in the reference example.

Figure 23:
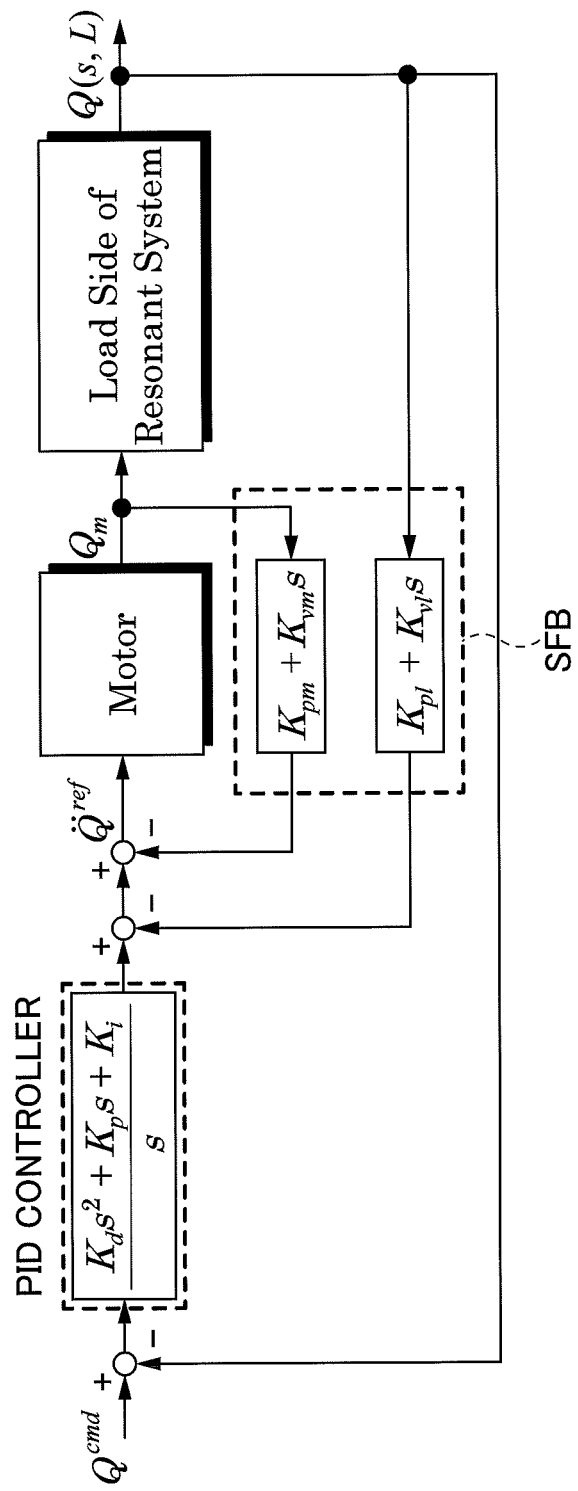
FIG. 23 is a block diagram illustrating the vibration control device used in the reference example.

FIG. 23 is a block diagram showing the vibration control device used in the reference example. As depicted, the PID control executed by the vibration control device according to the reference example is control in which the state feedback SFB is additionally used. As a result of operating the flexible arm using the depicted vibration control device according to the reference example, the result of the experiment was as follows. First, the case of low gain is described.

Figure 24:
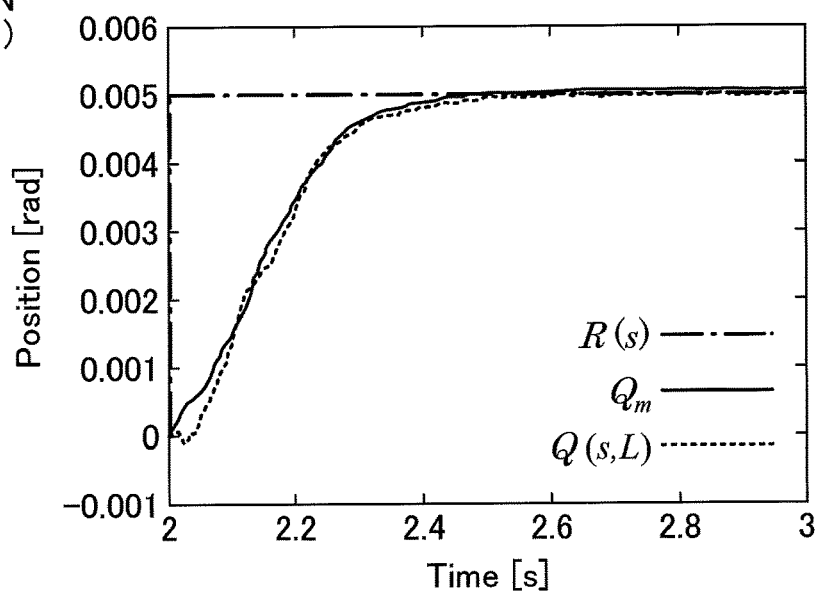
FIG. 24 is a diagram illustrating an example of an experimental result at low gain according to the reference example.

FIG. 24 is a diagram showing the example of the result of the experiment with low gain according to the reference example. The figure shows the case in which the vibration control device according to the reference example causes the flexible arm to move from the initial position (in the depicted example, the position where "Position" is "0") to the position indicated by "R(s)" (in the depicted example, the position where "Position" is "0.005"). Additionally, in the depicted example, the gain value was set to "low gain" compared to the case of "high gain," which is described below, and the gain value of the "low gain" was adjusted so that the control system band $\omega_n$ matched the primary resonance frequency $\omega_1$. The absolute value of each gain is determined according to the pole (the band of position control) $\omega_n$.

Thus, in "low gain," the band of the position control was adjusted to be equal to the primary resonance frequency $\omega_1$. Next, as a result of operating the flexible arm at high gain using the vibration control device according to the reference example, the result of the experiment was as follows.

Figure 25:
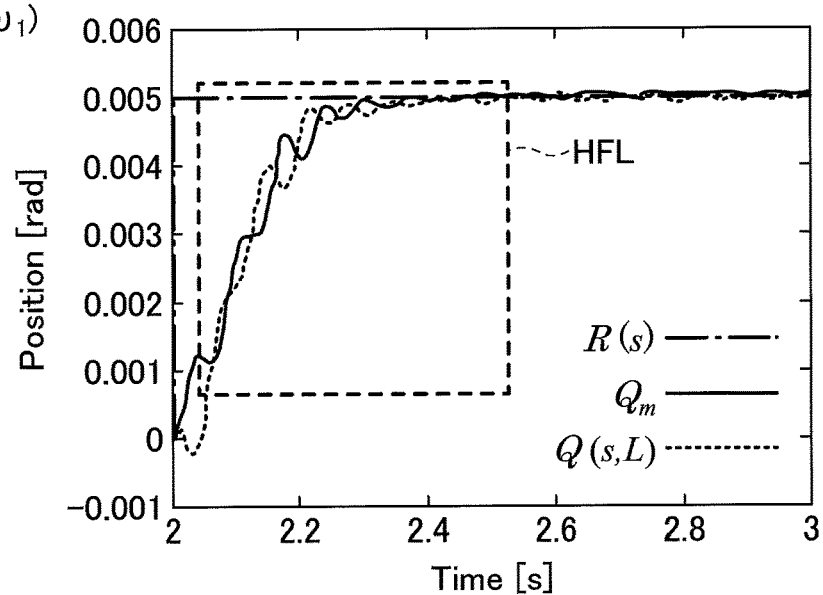
FIG. 25 is a diagram illustrating an example of an experimental result at high gain according to the reference example.

FIG. 25 is a diagram showing the example of the result of the experiment with high gain according to the reference example. The figure shows the case in which the vibration control device according to the reference example causes the flexible arm to move from the initial position, which is the same as that of FIG. 24, to the similar position indicated by "R(s)." Compared to the case shown in FIG. 24, the difference is that the gain value is "high gain," which is 1.2 times ($\omega_n$=1.2×$\omega_1$). The conditions other than the gain value, such as the initial position, are the same between FIG. 24 and FIG. 25. Namely, FIG. 25 shows the result of moving the flexible arm using the vibration control device according to the reference example with the setting of higher gain compared to the example shown in FIG. 24.

As depicted, in the reference example, when the gain was high, the higher order vibration HFL occurred. Note that the higher order vibration HFL is a vibration caused by the secondary resonance, etc.

In contrast, the result of operating the flexible arm using the vibration control device according to the embodiment of the present invention is described below. First, similar to the reference example, the case of low gain is described.

Figure 26:
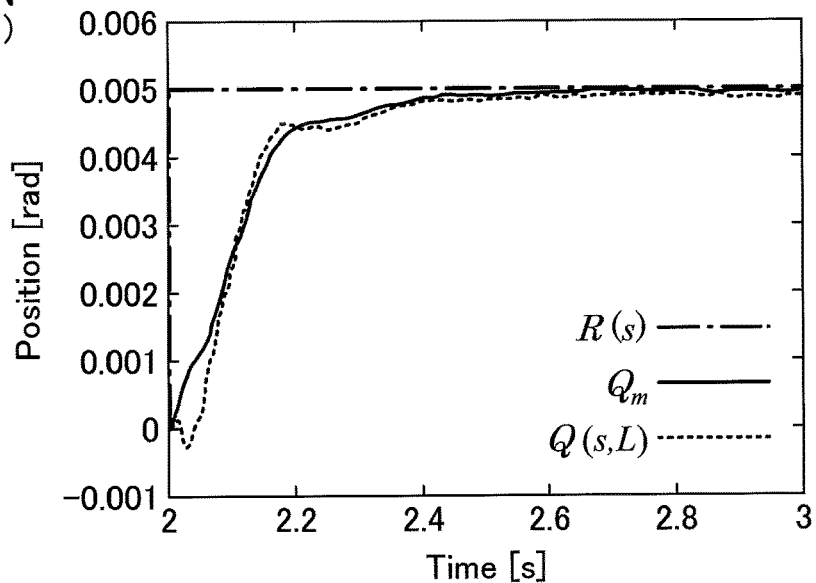
FIG. 26 is a diagram illustrating an example of an experimental result at low gain according to the embodiment of the present invention.

FIG. 26 is a diagram showing the example of the result of the experiment with low gain according to the embodiment of the present invention. The figure shows the result of the experiment with the settings of the gain value, the initial position, and the position indicated by "R(s)," which were the same as those of FIG. 24. Namely, similar to the reference example, the figure shows the result of moving the flexible arm with low gain using the vibration control device according to the embodiment of the present invention. Next, as a result of operating the flexible arm with high gain using the vibration control device according to the embodiment of the present invention, the result of the experiment was as follows.

Figure 27:
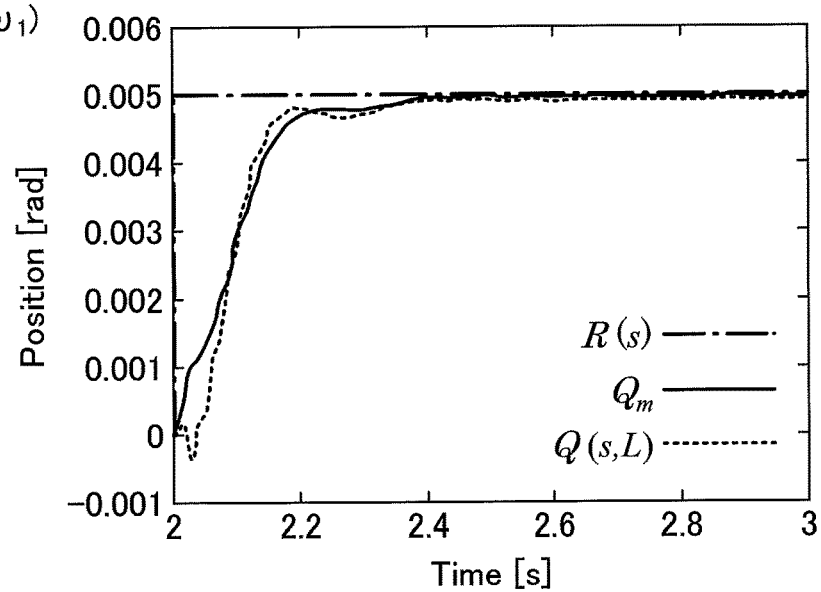
FIG. 27 is a diagram illustrating an example of an experimental result at high gain according to the embodiment of the present invention.

FIG. 27 is a diagram showing the example of the result of the experiment with the high gain according to the embodiment of the present invention. The figure shows the result of the experiment with the settings of the gain value, the initial position, and the position indicated by "R(s)," which were the same as those of FIG. 25. Namely, similar to the reference example, the figure shows the result of moving the flexible arm with high gain using the vibration control device according to the embodiment of the present invention.

As depicted, compared to FIG. 25, FIG. 27 shows the result with fewer higher order vibrations HFL (cf. FIG. 25). Thus, by using the vibration control device according to the embodiment of the present invention, even if the gain is set to high gain, the vibration generated by operating the flexible arm, etc., can be reduced.

The preferred embodiments of the present invention are described in detail above. However, the present invention is not limited to the specific embodiments, and various modifications and alterations may be made within the scope of the gist of the present invention described in the claims. The present international application is based on Japanese Priority Application No. 2015-157780 filed on Aug. 7, 2015, the entire contents of which are hereby incorporated herein by reference.

REFERENCE SIGNS LIST 1 vibration control system
10 vibration control device
15 motor
TAG machine
PFB positive feedback
CTL1 position control
CTL2 feedback control
MDL model

What is claimed is:

1. A vibration control device for moving an object by controlling an actuator, the vibration control device comprising:
an actuator controller configured to control a position and speed of the actuator;
a linear system model of the object generated based on a wave equation; and
a feedback unit configured to calculate a delay value of the object based on the linear system model, and configured to feed back a compensation value calculated based on the calculated delay value.

2. The vibration control device according to claim 1, wherein a model unit of the vibration control device is configured to generate the linear system model in which the object includes an infinite number of mass systems and an infinite number of elastic systems that connects the mass systems.

3. The vibration control device according to claim 2, wherein, when the linear system model includes the infinite number of mass systems and the infinite number of elastic systems that connects the mass systems, a dead time component included in the delay value of the object is calculated by the formula (20) described below:

$$Q_d(s, L) = e^{-\frac{L_n}{c_n}s} Q(s, L). \tag{20}$$

4. The vibration control device according to claim 1, wherein the delay value of the object includes a low-pass filter element.

5. The vibration control device according to claim 4, wherein the low-pass filter element is calculated by the formula (22) described below:

$$\frac{g_r^2}{s^2 + 2g_r s + g_r^2}. \tag{22}$$

6. The vibration control device according to claim 1, wherein the delay value of the object includes an inverse system element of the actuator controller.

7. The vibration control device according to claim 6, wherein the inverse system element is calculated by the formula (23) below:

$$\frac{s^2 + K_v s + K_p}{K_p}. \tag{23}$$

8. The vibration control device according to claim 1, wherein the position of the object is a tip of the object.

9. The vibration control device according to claim 1, wherein the actuator controller is configured to apply P control or PI control to the actuator.

10. A vibration control system for moving an object by controlling an actuator, the vibration control system being provided with one or more information processing devices, the vibration control system comprising:
- an actuator controller configured to control a position and speed of the actuator;
- a linear system model of the object generated based on a wave equation; and
- a feedback unit configured to calculate a delay value of the object based on the linear system model, and configured to feed back a compensation value calculated based on the calculated delay value.

11. A vibration control method executed by a vibration control device for moving an object by controlling an actuator, the vibration control method comprising:
- controlling, by the vibration control device, a position and speed of the actuator;
- calculating, by the vibration control device, a delay value of the object based on a linear system model of the object generated based on a wave equation; and
- feeding back, by the vibration control device, a compensation value calculated based on the calculated delay value.

12. A non-transitory recording medium storing a program for causing a computer to execute vibration control, the computer being for moving an object by controlling the actuator, wherein the program causes the computer to execute:
- controlling a position and speed of the actuator;
- calculating a delay value of the object based on a linear system model of the object generated based on a wave equation; and
- feeding back a compensation value calculated based on the calculated delay value.

* * * * *